(12) United States Patent
Mukai

(10) Patent No.: US 9,100,565 B2
(45) Date of Patent: Aug. 4, 2015

(54) IMAGE PROCESSING APPARATUS, IMAGE CAPTURE DEVICE, AND COMPUTER PROGRAM

(71) Applicant: Panasonic Corporation, Osaka (JP)

(72) Inventor: Tsutomu Mukai, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 112 days.

(21) Appl. No.: 13/798,500

(22) Filed: Mar. 13, 2013

(65) Prior Publication Data

US 2013/0242124 A1 Sep. 19, 2013

(30) Foreign Application Priority Data

Mar. 14, 2012 (JP) .................. 2012-057030

(51) Int. Cl.
*H04N 5/232* (2006.01)

(52) U.S. Cl.
CPC ........... *H04N 5/232* (2013.01); *H04N 5/23212* (2013.01); *H04N 5/23245* (2013.01)

(58) Field of Classification Search
CPC . H04N 5/2256; H04N 5/232; H04N 5/23212; H04N 5/23245
USPC .............. 348/220.1, 231.99, 231.2, 371, 370, 348/239
See application file for complete search history.

(56) References Cited

U.S. PATENT DOCUMENTS

| | | | |
|---|---|---|---|
| 2004/0033071 A1 | 2/2004 | Kubo | |
| 2007/0212051 A1* | 9/2007 | Moriya | 396/147 |
| 2008/0231757 A1* | 9/2008 | Tojo | 348/700 |
| 2009/0033754 A1* | 2/2009 | Yoshikawa | 348/220.1 |
| 2009/0207263 A1 | 8/2009 | Mizuno et al. | |
| 2012/0148216 A1* | 6/2012 | Pavagada et al. | 386/278 |

FOREIGN PATENT DOCUMENTS

| | | |
|---|---|---|
| JP | 2004-297177 A | 10/2004 |
| JP | 2008-306774 A | 12/2008 |
| JP | 2009/200559 A | 9/2009 |

OTHER PUBLICATIONS

Co-pending U.S. Appl. No. 13/798,433, filed Mar. 13, 2013 (application provided).
Co-pending U.S. Appl. No. 13/798,889, filed Mar. 13, 2013 (application provided).
Co-pending U.S. Appl. No. 14/152,359, filed Jan. 10, 2014 (application provided).

* cited by examiner

*Primary Examiner* — Nhan T Tran
*Assistant Examiner* — Chan Nguyen
(74) *Attorney, Agent, or Firm* — Renner, Otto, Boisselle & Sklar, LLP

(57) ABSTRACT

An image processing apparatus according to an aspect of the present disclosure includes: an image processor configured to generate first movie data based on image capturing data, the image capturing data being obtained in response to a shooting instruction; and a controller configured to generate a movie file including second movie data, the second movie data being obtained by deleting a portion of a movie represented by the first movie data when at least one of (i) the contents of management information associated with the first movie data and (ii) the contents of the first movie data itself satisfy a predetermined condition.

10 Claims, 15 Drawing Sheets

FIG. 7

| CONTENT ID | CONTENT TYPE | DIGEST MOVIE ID | REAL FILE NAME | CHAPTER INFORMATION ||| RELATION INFORMATION || SHOOTING INFORMATION ||||||
|---|---|---|---|---|---|---|---|---|---|---|---|---|---|
| | | | | START TIME | END TIME | CHAPTER TITLE | ASSOCIATED CONTENT ID | BEFORE/ AFTER INFORMATION | DATE AND TIME OF SHOOTING | MODE | GPS | SHOOTING POSTURE | FLASH | MAGNITUDE OF CAMERA SHAKE |
| D1—P1 | Picture | D1 | D1G001.JPG | — | — | | D1—C1b<br>D1—C1a | — | JAN-1-2012 10:00:00 | PORTRAIT | NORTH LATITUDE: NN EAST LONGITUDE: EE | HORIZONTAL | ON | 50 |
| D1—C1b | Video | D1 | DIG001.MP4 | 0:00:00 | 0:00:05 | | D1—P1 | BEFORE | JAN-1-2012 10:00:00 | PORTRAIT | NORTH LATITUDE: NN EAST LONGITUDE: EE | HORIZONTAL | ON | 50 |
| D1—C1a | Video | D1 | DIG001.MP4 | 0:00:05 | 0:00:10 | | D1—P1 | AFTER | JAN-1-2012 10:00:05 | PORTRAIT | NORTH LATITUDE: NN EAST LONGITUDE: EE | HORIZONTAL | ON | 50 |

| SHOOTING STATE | PORTION TO DELETE | TIME FOR DELETING (Rdel) |
|---|---|---|
| FLASH ON | JUST BEFORE RIGHT AFTER | 0.5 SECONDS |
| AF ASSIST LAMP ON | JUST BEFORE | 0.3 SECONDS |
| ... | ... | ... |

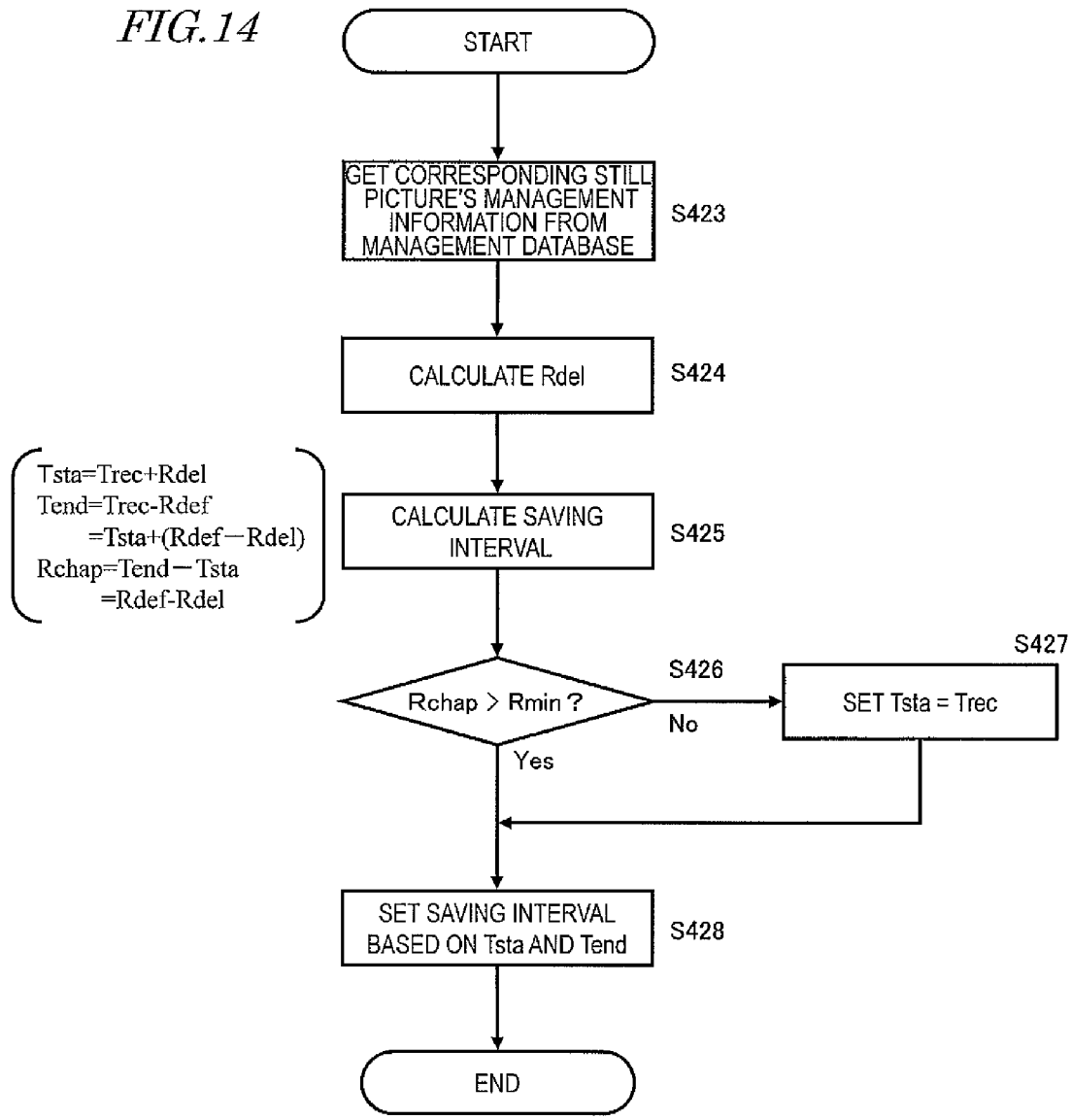

MOVIE-ONLY PLAYBACK

MOVIE/STILL PICTURE COMBINED PLAYBACK

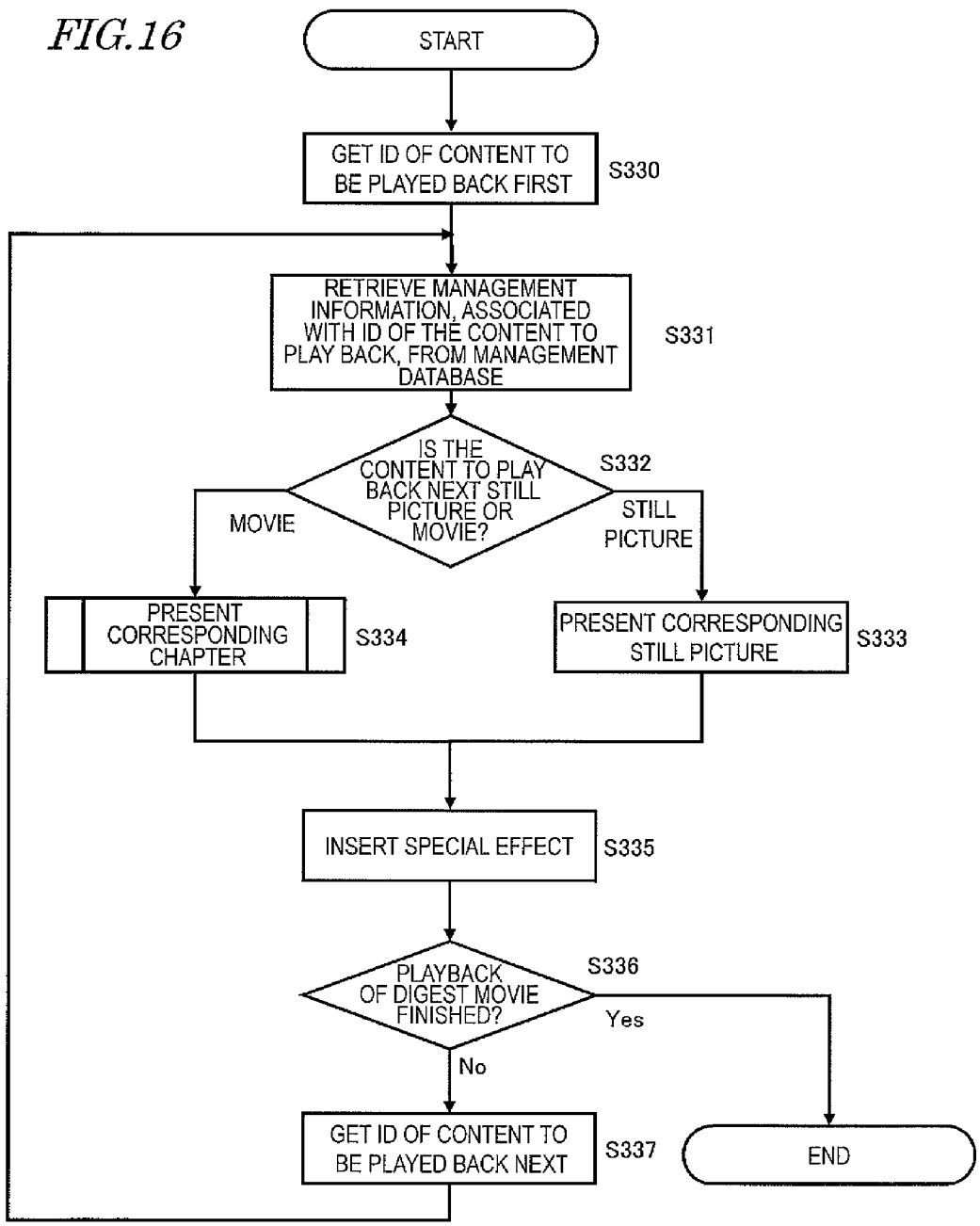

IMAGE PROCESSING APPARATUS, IMAGE CAPTURE DEVICE, AND COMPUTER PROGRAM

BACKGROUND

1. Technical Field

The present disclosure relates to an electronic device that processes a movie.

2. Description of the Related Art

An image capture device that can generate a digest movie as a digest of a movie that has been shot is known.

For example, Japanese Laid-Open Patent Publication No. 2009-200559 discloses an image capture device that generates a single still picture and a movie stream as a digest movie when the shutter release key is pressed while a movie is being shot.

SUMMARY

One non-limiting, and exemplary embodiment provides a technique to generate a more favorable digest movie for the user.

In one general aspect, an image processing apparatus disclosed herein includes: an image processor configured to generate first movie data based on image capturing data, the image capturing data being obtained in response to a shooting instruction; and a controller configured to generate a movie file including second movie data, the second movie data being obtained by deleting a portion of a movie represented by the first movie data when at least one of (i) the contents of management information associated with the first movie data and (ii) the contents of the first movie data itself satisfy a predetermined condition.

In another aspect, an image processing apparatus disclosed herein includes: an interface configured to obtain, from another device, first movie data that has been generated by shooting; and a controller configured to generate a movie file including second movie data by deleting a portion of a movie represented by the first movie data when at least one of (i) the contents of management information associated with the movie data and (ii) the first movie data itself satisfy a predetermined condition.

In another aspect, an image processing method disclosed herein includes: obtaining first movie data that has been generated by shooting; and generating a movie file including second movie data by deleting a portion of a movie represented by the first movie data when at least one of (i) the contents of management information associated with the movie data and (ii) the first movie data itself satisfy a predetermined condition.

According to the above aspect, it is possible to generate a more favorable digest movie for users.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 7 schematically illustrates an exemplary list of information to be managed in a management database.
FIG. 14 is a flowchart showing the detailed procedure of carrying out the save decision processing on one chapter in that another example.
FIG. 16 is a flowchart showing an exemplary procedure of playing back a digest movie.

DETAILED DESCRIPTION

Hereinafter, embodiments will be described in detail with reference to the accompanying drawings as needed. It should be noted that the description thereof will be sometimes omitted unless it is absolutely necessary to go into details. For example, description of a matter that is already well known in the related art will be sometimes omitted, so will be a redundant description of substantially the same configuration. This is done solely for the purpose of avoiding redundancies and making the following description of embodiments as easily understandable for those skilled in the art as possible.

It should be noted that the present inventors provide the accompanying drawings and the following description to help those skilled in the art understand the present disclosure fully. And it is not intended that the subject matter defined by the appended claims is limited by those drawings or the description.

Embodiment 1

Figure 1:
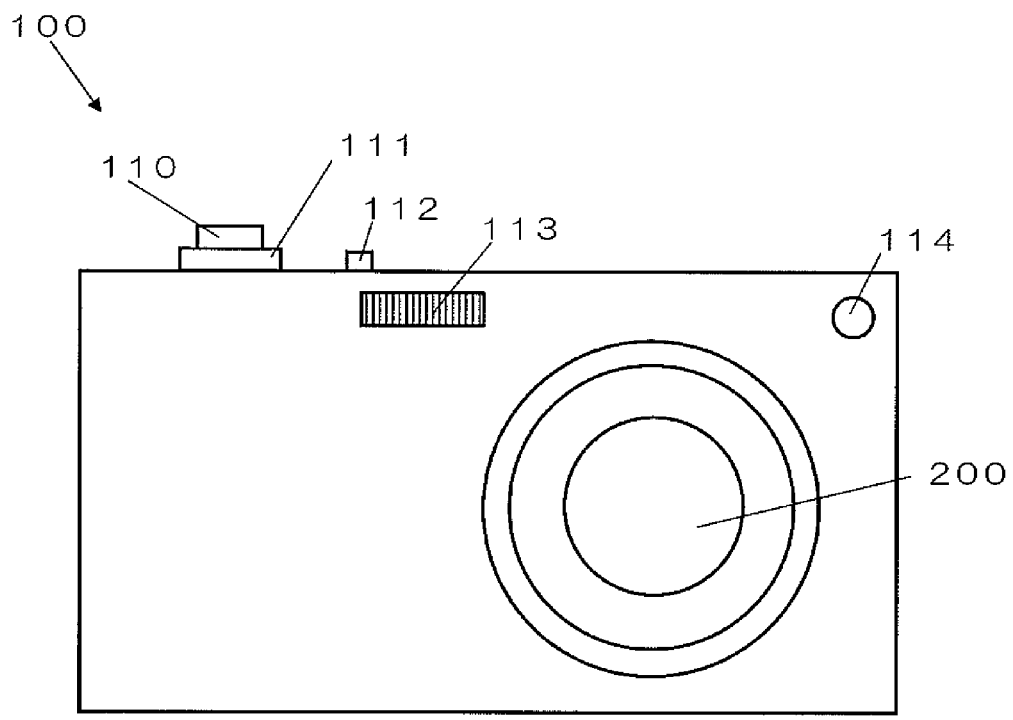
FIG. 1 is a front view of a digital camera 100.
Figure 2:
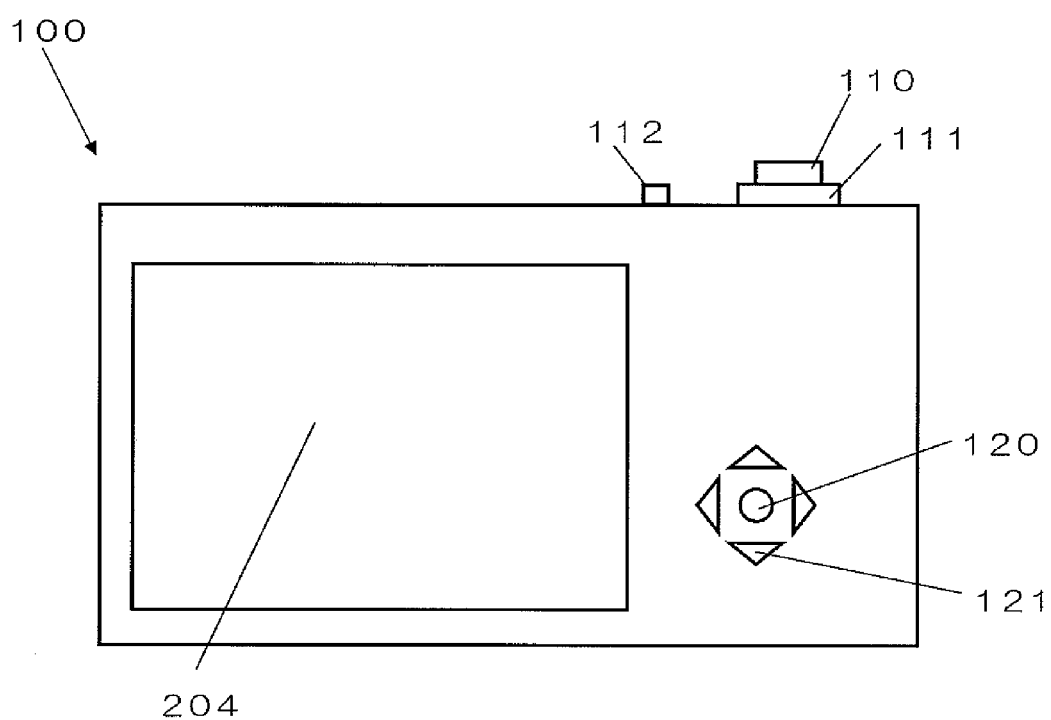
FIG. 2 is a rear view of the digital camera 100.
Figure 3:
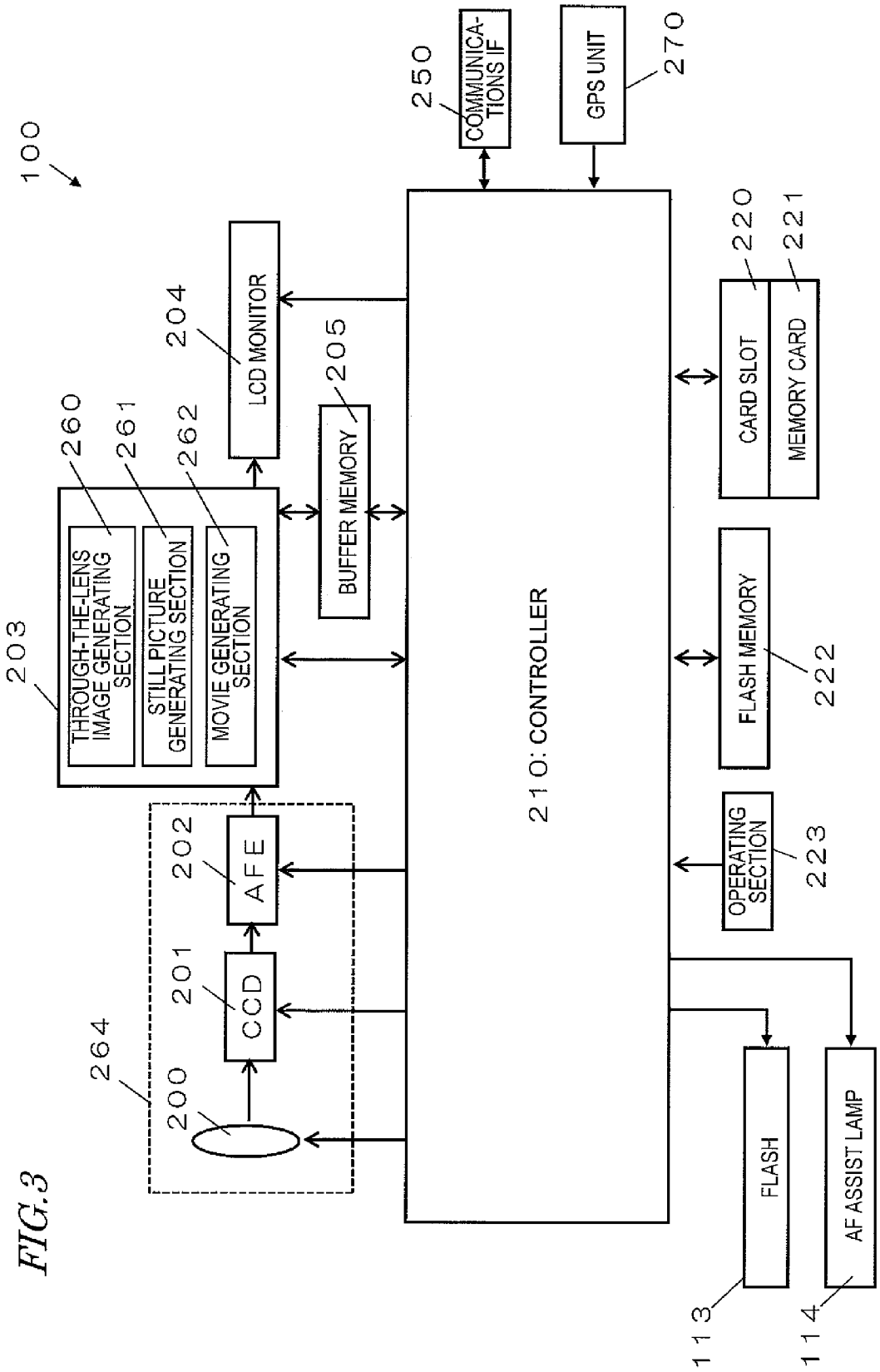
FIG. 3 is a block diagram illustrating how respective components of the digital camera 100 are electrically connected together.

FIGS. 1 and 2 are schematic representations illustrating the configuration of a digital camera (image capture device) 100 as a first embodiment on its front side and on its rear side, respectively. FIG. 3 is a block diagram generally illustrating an internal configuration for the digital camera 100.

The digital camera 100 of this embodiment has multiple modes including shooting modes, a playback mode and a setting mode. The shooting modes include a normal shooting mode and a digest movie recording mode. In the digest movie recording mode, the digital camera 100 continuously writes movie data on a buffer memory 205. And in response to a user's instruction (e.g., an instruction to shoot a still picture that has been given by pressing a release button 110 or an instruction to make a digest movie) that is received during that continuous writing, the digital camera 100 selects parts of the movie data that has been written on the buffer memory 205 for a predetermined period around the time of instruction and writes those selected parts as a digest movie file. Specifically, when triggered by the instruction to shoot a still picture, the digital camera 100 writes movie data for a few seconds just before the still picture is shot, movie data for a few seconds right after the still picture has been shot, or movie data for a few seconds just before and right after the still picture has been shot on a storage medium such as a memory card 221. Alternatively, the digital camera 100 may also write movie data for a few seconds just before and/or right after an instruction to record a digest movie has been given on a storage medium such as the memory card 221 without shooting a still picture.

In this description, a single unit of movie data to be captured during the predetermined period of time (e.g., just before and right after the timing to shoot a still picture) will be referred to herein as a "chapter". Every time a chapter is recorded, a decision is made whether the chapter satisfies a predetermined condition or not. If the answer is YES, the chapter is combined with the previous chapters that have been written there so far, thus forming a single movie file to be written. A movie file thus formed will be referred to herein as a "digest movie file". To update such a digest movie file that has been written with the contents of a new chapter will be referred to herein as "adding" that chapter to the digest movie file. Every time a chapter is newly generated, the controller 210 of the digital camera 100 determines whether that chapter should be added to the old digest movie file or saved on a new digest movie file separately. The controller 210 saves all chapters that have been generated during a predetermined period (e.g., one day) collectively on a single digest movie file. Such a movie data writing mode will be referred to herein as a "digest movie recording mode".

For example, if a chapter is supposed to be generated in response to an instruction to shoot a still picture, the digital camera 100 generates not only the chapter but also management information about a still picture that has been generated at the same time. And by reference to that management information, the digital camera 100 generates a digest movie file for a movie period specified by the chapter generated, except only a portion of the movie period (e.g., a flash firing period). Even in generating a chapter without responding to such an instruction to shoot a still picture, the digital camera 100 can also generate a digest movie file, including movie data obtained by deleting a portion of the chapter, by reference to management information associated with that chapter. As a result, a more favorable digest movie can be generated for the user.

Hereinafter, the configuration and operation of the digital camera 100 of this embodiment will be described more specifically.

[1-1. Configuration]

First of all, the configuration of the digital camera 100 of this embodiment will be described with reference to FIGS. 1 through 3.

As shown in FIG. 1, the digital camera 100 includes a lens barrel to house an optical system 200 in, a flash 113, and an AF (autofocus) assist lamp 114 on its front side. The digital camera 100 also includes a release button 110, a zoom lever 111 and a power button 112, on the top. As shown in FIG. 2, the digital camera 100 includes an LCD monitor 204, a menu button 120 and cross buttons 121, on its rear side. In this description, those members that accept the user's instruction, including the release button 110, the zoom lever 111, the power button 12, the menu button 120 and the cross buttons 121 will be collectively referred to herein as an "operating section".

FIG. 3 illustrates how respective components of this digital camera 100 are electrically connected together. The digital camera 100 includes an image capturing section 264, an image processor 203, an LCD monitor 204, a buffer memory 205, a controller 210, a flash (strobe light source) 113, an AF assist lamp 114, an operating section 223, a flash memory 222, a card slot 220, a communications interface (IF) 250, and a GPS unit 270. The image capturing section 264 includes an optical system 200, a CCD image sensor 201, and an AFE (analog front end) 202. The image processor 203 includes a through-the-lens image generating section 260, a still picture generating section 261, and a movie generating section 262. Although the memory card 221 is illustrated in FIG. 3, the memory card 221 does not form part of this digital camera 100 but is a removable storage medium which is connectible to the card slot 220.

The digital camera 100 makes the CCD image sensor 201 convert into an electrical signal (i.e., capture) the subject image that has been produced through the optical system 200. Then, the CCD image sensor 201 generates image capturing data based on the subject image that has been produced on the image capturing plane. The image capturing data thus generated is subjected to various kinds of processing by the AFE 202 and the image processor 203 to be image data. The image data thus generated is then written on storage media including the flash memory 222 and the memory card 221. And an image represented by the image data that has been written on the flash memory 222 and the memory card 221 is displayed on the LCD monitor 204 in accordance with the instruction given by the user who is operating this digital camera 100 using the operating section 223.

Hereinafter, the respective components of the digital camera 100 shown in FIGS. 1 to 3 will be described in detail one by one.

The optical system 200 includes a focus lens, a zoom lens, a diaphragm and a shutter. Optionally, the optical system 200 may further include an OIS (optical image stabilizer) lens as well. It should be noted that this optical system 200 may include any other number of lenses and may be made up of any number of groups of lenses. The focus lens, the zoom lens, the diaphragm, and the shutter are driven by their associated drivers (such as a DC motor or a stepping motor) in accordance with a control signal supplied from the controller 210.

The COD image sensor 201 is an imager which generates image capturing data based on the subject image that has been produced by the optical system 200. The CCD image sensor 201 generates image data for a new frame at regular time intervals. Also, the CCD image sensor 201 adjusts the degree of exposure by performing an electronic shuttering operation. Optionally, any other type of image sensor such as a CMOS image sensor or an NMOS image sensor may be used instead of the CCD image sensor 201.

The AFE 202 is connected to the CCD image sensor 201 and subjects the image capturing data, which has been generated by the CCD image sensor 201, to correlated double sampling, gain control, and other kinds of processing. Also, the AFE 202 converts the analog image capturing data into digital image capturing data and then outputs the image capturing data thus converted to the image processor 203.

The image processor 203 is connected to the AFE 202, receives the image capturing data from the AFE 202 and subjects the image capturing data to various kinds of processing, thereby generating image data. Examples of those various kinds of processing include gamma correction, white balance correction, luminance and color difference (YC) conversion, electronic (or digital) zooming, compression and expansion. However, these are just examples. Based on the image capturing data provided by the AFE 202, the image processor 203 can extract the feature point of a particular subject from an image area specified by the image capturing data and can make a decision on the subject. For example, if the feature point of some person's face is added to a list in advance, then the image processor 203 can recognize that person's face.

The image processor 203 may be implemented as a digest signal processor (DSP) or a microcontroller, for example. The image processor 203 may be implemented as either only a set of hardware circuits or a combination of hardware and software (computer program). The image processor 203 includes a through-the-lens image generating section 260, a still picture generating section 261, a movie generating section 262 and other image generating sections.

The through-the-lens image generating section 260 generates image data to be displayed on the LCD monitor 204 based on the image capturing data provided sequentially by the AFE 202 (at a rate of 60 frames per second, for example). Looking at the real-time video displayed on the LCD monitor 204, the user can determine easily the angle of view of shooting and other parameters.

Based on the image capturing data obtained at the timing when the release button 110 is pressed down, the still picture generating section 261 generates a still picture to be recorded. The still picture generating section 261 generates a still picture file compliant with the JPEG standard, for example. In generating a still picture file, the still picture generating section 261 adds management information about the still picture to that file. Examples of the management information includes an F value, a shutter speed, sensitivity, GPS information, information about the shooting mode, information indicating whether a picture has been shot with flashlight or not, and information indicating whether the AF assist lamp has been used or not. The still picture file that has been generated by the still picture generating section 261 is written by the controller 210 on the memory card 221. In writing the still picture file on the memory card 221, the controller 210 adds management information about the still picture file to a management database.

The movie generating section 262 generates movie data based on the image capturing data supplied from the image capturing section 264. Based on the image capturing data obtained between a point in time when a movie recording button (not shown) included in the operating section 223 was pressed down and a point in time when the movie recording button is pressed down again to stop recording, the movie generating section 262 generates a movie file to be written. The movie generating section 262 generates a movie file compliant with the AVCHD™ standard or the MP4 standard, for example. In addition, in the digest movie recording mode, the movie generating section 262 continuously generates movie data based on the image capturing data and writes the data on the buffer memory 205. And based on the image capturing data that has been obtained in a predetermined period around the timing when the release button 110 is pressed down (which will be sometimes referred to herein as "release timing"), the movie generating section 262 generates movie data (chapters). The predetermined period may be just before and right after the release timing, for example. The data of the movie files or chapters thus generated is written by the controller 210 on the memory card 221. In adding the chapters to the digest movie file in the memory card 221, the controller 210 adds management information about the chapters to the management database.

In the digest movie recording mode, the still picture generating section 261 generates a still picture file based on the image capturing data obtained when the release button 110 is pressed down. The controller 210 writes the still picture file thus generated on the memory card 221. In the meantime, based on the image capturing data obtained in a predetermined period around the timing when the release button 110 is pressed down (e.g., for a few seconds just before and right after the release timing), the movie generating section 262 generates movie data (chapters). The controller 210 adds the chapters thus generated to the digest movie file and writes them on the memory card 221. Also, the controller 210 associates the still picture file, the chapter, and the digest movie file to which the chapter has been added with each other if those files and chapter have been generated at substantially the same time, and writes them on the memory card 221. Specifically, by reference to the management database, the controller 210 associates those files and chapter if they have been generated at substantially the same time. The management database will be described in detail later with reference to FIG. 7.

The LCD monitor 204 is arranged at the rear of this digital camera 100 and displays an image based on the image data that has been processed by the image processor 203. The LCD monitor 204 may display not only an image but also various kinds of settings of this digital camera 100. The LCD monitor 204 may be replaced with an organic EL display or any other kind of display.

The controller 210 is a processor that controls the overall operation of this digital camera 100, and is suitably implemented as a combination of a ROM (read-only memory) to store a program and other sorts of information and a CPU (central processing unit) to process the program and other information. The ROM stores programs about an autofocus (AF) control and an autoexposure (AE) control and a program to control the overall operation of this digital camera 100.

The controller 210 may be implemented as a hardwired electronic circuit or a microcontroller, for example. Or the controller 210 and the image processor 203 may form a single semiconductor chip. Also, the ROM does not have to be one of the internal components of the controller 210 but may also be provided outside of the controller 210 as well. As shown in FIG. 3, the controller 210 is electrically connected to the other components and controls those components with control signals.

The controller 210 can perform an AF control. First of all, the controller 210 gets a contrast value in a particular subject area of the image data from the image processor 203. By getting such contrast values continuously, the controller 210 senses the focusing state in a particular subject area and drives the focus lens so as to focus on that subject area. The time for the controller 210 to carry out the AF control may be the time when the user's instruction given by pressing the release button 110 halfway through is accepted. Alternatively, the controller 210 may also be configured to carry out the AF control continuously throughout the shooting mode. Information about the focusing state while a still picture is being shot is managed with the management database to be described later.

The controller 210 can also perform an autoexposure (AE) control. First of all, the controller 210 gets luminance information in a particular subject area of the image data from the image processor 203. In order to get an appropriate exposure of the subject, the controller 210 calculates exposure values based on pieces of luminance information that have been obtained continuously. Based on the exposure values calculated and a predetermined program diagram, the controller 210 determines an F value and a shutter speed. The program diagram is information that defines a relation between the exposure value, the F value, and the shutter speed and is stored in advance in a storage medium such as a ROM. By monitoring the luminance information to be obtained from the image data, the controller 210 performs the RE control continuously. The exposure value for shooting may be fixed either when the release button 110 is pressed halfway by the user or when the release button 110 is pressed fully by him or her. The F value, shutter speed, sensitivity and other kinds of information to be relied on when a still picture is going to be shot is managed using the management database to be described later.

The buffer memory 205 is a storage medium that functions as a work memory for the image processor 203 and the controller 210 and may be implemented as a DRAM (dynamic random access memory), for example. Meanwhile, the flash memory 222 functions as an internal memory to store the image data and other kinds of information.

The card slot 220 is an interface, to/from which the memory card 221 is readily insertable and removable, and can be connected to the memory card 221 both electrically and mechanically. Optionally, the card slot 220 may have the ability to control the memory card 221.

The memory card 221 is an external memory with an internal storage medium such as a flash memory, and can store data such as the image data to be processed by the image processor 203. In this embodiment, the memory card 221 is supposed to be used as an exemplary external memory. However, this is only an example. Alternatively, the external memory may also be a storage medium such as a hard disk or an optical disc.

The operating section 223 is a generic term that refers collectively to a number of operating buttons and dials that are arranged on the outer shell of this digital camera 100, and accepts the user's instructions. Specifically, the operating section 223 includes the release button 110, the zoom lever 111, the power button 112, the menu button 120 and the cross buttons 121 shown in FIGS. 1 and 2. On accepting the user's instruction, the operating section 223 sends various operation instruction signals to the controller 210.

The release button 110 is a two-stage press button that can be pressed down halfway and fully by the user. Specifically, when the release button 110 is pressed halfway by the user, the controller 210 performs the autofocus (AF) control and the autoexposure (AE) control described above, thereby determining the shooting condition. And when the release button 110 is pressed down fully by the user, the controller 210 writes the image data, (which may be a still picture or a chapter and) which has been captured and generated when the button is pressed down fully, on the memory card 221.

The menu button 120 is another press button. When the menu button 120 is pressed by the user, the controller 210 gets a menu displayed on the LCD monitor 204. The menu is displayed on the screen to allow the user to determine the settings of the shooting and playback conditions. The menu button 120 may also function as an ENTER button so that if the menu button 120 is pressed while the user is choosing one of the options of any of various condition setting items, that option is selected.

The cross buttons 121 are yet another set of press buttons, which are arranged over, under, and on the right and left of the menu button 120. By pressing any of these cross buttons 121, the user can choose one of the options of any of the various condition setting items that are being displayed on the LCD monitor 204.

The flash 113 includes a xenon tube, a capacitor, a booster, and a firing trigger circuit. In accordance with a control signal supplied from the controller 210, the booster applies a high voltage to the capacitor. Also in accordance with a control signal supplied from the controller 210, the firing trigger circuit discharges the high voltage that has been applied to, and stored in, the capacitor, thereby instantaneously emitting flash light from the xenon gas in the xenon tube synchronously with acceptance of the instruction to shoot a still picture. As a result, the digital camera 100 can shoot a still picture of the subject irradiated with the flashlight. By firing the flash 113 instantaneously with respect to the subject, the subject can be shot with the lack of brightness compensated for. Information indicating whether the flash has been fired or not while a still picture is being shot is managed by the management database to be described later.

The AF assist lamp 114 emits an AF assist light beam in order to compensate for the lack of illuminance of the subject and get the subject's contrast value while the controller 210 is performing the AF control described above. Particularly when the subject has low illuminance, it is difficult to get an AF controllable contrast value from the subject. With the AF assist light beam, however, the controller 210 can get an AF controllable contrast value in an increased number of scenes. Information indicating whether the AF assist light beam has been emitted or not during the AF control is managed by the management database to be described later.

The communications interface 250 is a wireless or wired communications interface. Through this communications interface 250, the controller 210 can be connected to other communications devices via an access pointer. The communications interface 250 may be implemented as a wireless LAN or a wired LAN, for example.

The GPS unit 270 is a GPS receiver which detects the current location of the digital camera 100 using the global positioning system by satellite. The controller 210 gets information about the current location (including the latitude and the longitude) via the GPS unit 270. The digital camera 100 can associate the current location information provided by the GPS unit 270 with the image shot (which may be either a still picture or a movie such as a chapter). Information about the current location while a still picture is being shot is managed by the management database to be described later.

It should be noted that the configuration described above is only an example and any other configuration could be adopted as well as long as the controller 210 can perform the operation to be described below. For example, the digital camera 100 may include some additional components other than the ones shown in FIG. 3 or may have some of its components omitted.

[1-2. Operation]

Hereinafter, it will be described with reference to FIGS. 4 through 17 exactly how this digital camera 100 operates.

First of all, it will be outlined how to perform a digest movie writing operation. In the following example, in response to an instruction to shoot a still picture, a movie is supposed to be recorded as chapters for a few seconds each before and after the timing when that instruction is issued.

Figure 4:
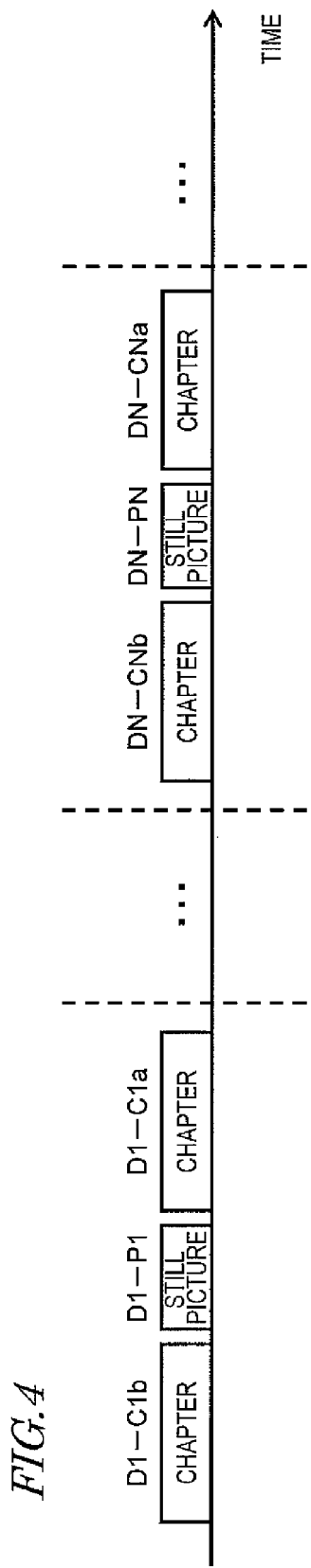
FIG. 4 generally illustrates how to record a digest movie.

FIG. 4 illustrates conceptually a series of still pictures and chapters, which have been recorded in response to an instruction to shoot a still picture as a trigger and which are arranged time sequentially on the time axis. As shown in FIG. 4, there are two chapters just before and right after each still picture. In this example, an $N^{th}$ (where N is a natural number) digest movie will be identified herein by DN, the chapters just before and right after the $N^{th}$ still picture has been shot will be identified herein by DN-CNb and DN-CNa, respectively, and the $N^{th}$ still picture will be identified herein by DN-PN. Thus, the first digest movie is identified herein by D1, for example. In that case, the chapters just before and right after the first still picture has been shot are identified herein by D1-C1b and D1-C1a, respectively, and the still picture shot at this time is identified herein by D1-P1.

[1-2-1. Configuration of Digest Movie Menu]

Figure 5:
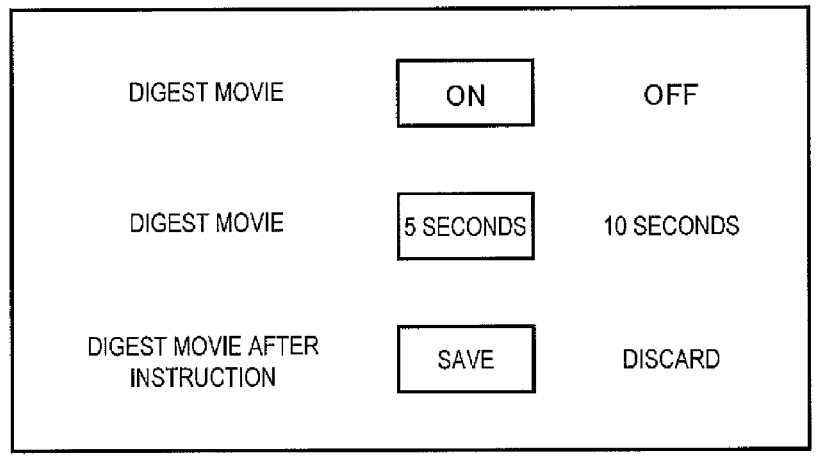
FIG. 5 illustrates generally how the digest movie setting menu looks.

FIG. 5 illustrates generally how the digest movie menu looks. In the digital camera 100 of this embodiment, when the user operates the operating section 223, a digest movie menu such as the one shown in FIG. 5 may be displayed on the LCD monitor 204.

As shown in FIG. 5, the digest movie menu includes three items that allow the user to decide whether or not he or she'd like to record the digest movie (ON/OFF), how long the chapters to generate should be (e.g., 5 seconds or 10 seconds), and whether or not the movie right after an instruction to record a still picture has been accepted should be generated as a chapter (save or discard). Optionally, the digest movie menu may further include another item that allows the user to decide whether or not the movie just before an instruction to record a still picture has been accepted should be generated as a chapter (save or discard). By operating the operating section 223, the user can choose any of these options of each item.

In the example to be described below, the user's preference as to whether or not to record the digest movie is supposed to be "ON", his or her preference as to how long the chapters to generate should be is supposed to be "5 seconds", and his or her preference as to whether or not the movie right after the instruction to record a still picture has been accepted should be generated as a chapter is supposed to be "save".

[1-2-2. Format of Digest Movie Management Information]

Figure 6:
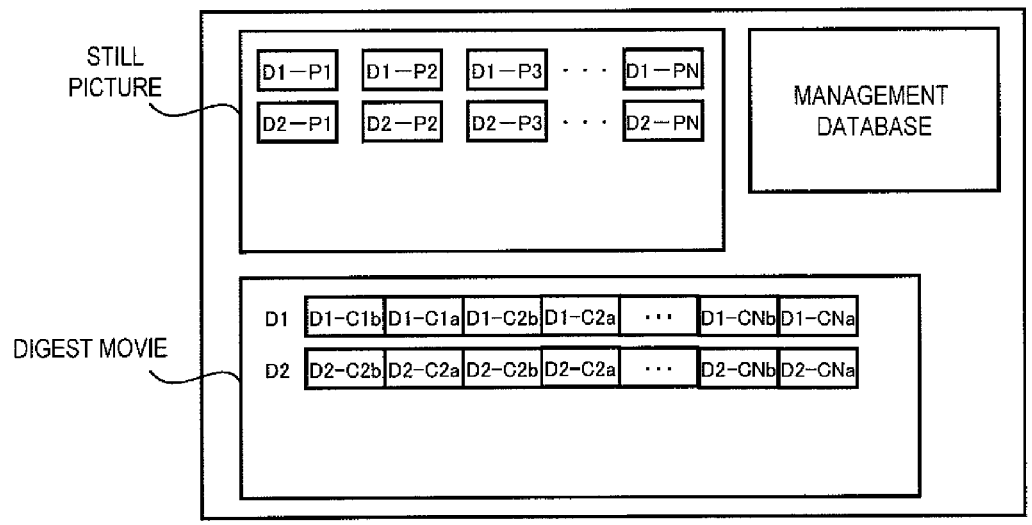
FIG. 6 illustrates the format of data stored in a memory card.

Next, the format of data to be written on the memory card 221 in the digest movie recording mode will be described with reference to FIG. 6, which illustrates conceptually the format of data to be written on the memory card 221.

A still picture, a digest movie and a management database are written on the memory card 221. In the management database, information about shooting the still picture and the chapters (which will be referred to herein as "shooting information") is managed. By reference to the management database, the controller 210 can check out the shooting information of the still picture and chapters that are stored on the memory card 221. Also managed in the management database is information about the relation between the still picture and the chapters that have been generated just before and right after the still picture (which will be referred to herein as "relation information"). By reference to the management database, the controller 210 can see what still picture has been written on the memory card 221 and what chapters have been written in association with the still picture.

Next, the management information (including shooting information and relation information) to be managed in the management database will be described with reference to FIG. 7, which schematically illustrates a list of information to be managed in the management database.

As shown in FIG. 7, the management database includes content IDs, content types, digest movie IDs, real file names, chapter information (including the start time, end time and title of the chapter), relation information (including the ID of associated content and information about chapters before and after the still picture), and shooting information (including the date and time of shooting, scene mode information, geographic location information (GPS information), aspect ratio information, flash information, and camera shake information). The management database may also include place name information and angle of view information in addition to the pieces of information shown in FIG. 7. Even though these various kinds of information are supposed to be managed in this embodiment by using such a management database, these pieces of information may also be managed in the header section of each content data (including Exif and user data area).

The content ID is a unique identifier to be given to each content (which may be a still picture or a movie (chapter)). The content type is a piece of information indicating whether each content is a still picture (picture) or a movie (video). The digest movie ID is the ID of the digest movie in which each chapter is saved. The real file name is the name of the real file that includes each content. The chapter information includes the title of each chapter and the start time and end time in the digest movie. The relation information is information about the correlation between a still picture and chapters that have been generated with the still picture. The relation information includes the associated content ID and information about the chapters before and after the still picture. The associated content ID is the content ID of the associated movie (chapter) in the case of a still picture or the content ID of the associated still picture in the case of a movie (chapter)). The information about the chapters before and after the still picture is a piece of information indicating whether the chapter is just before or right after the timing of shutter release. Optionally, the shooting information may further include other pieces of information about the standard of the movie.

[1-2-3. Digest Movie Recording Operation]

Hereinafter, it will be described how to record a digest movie.

Figure 8:
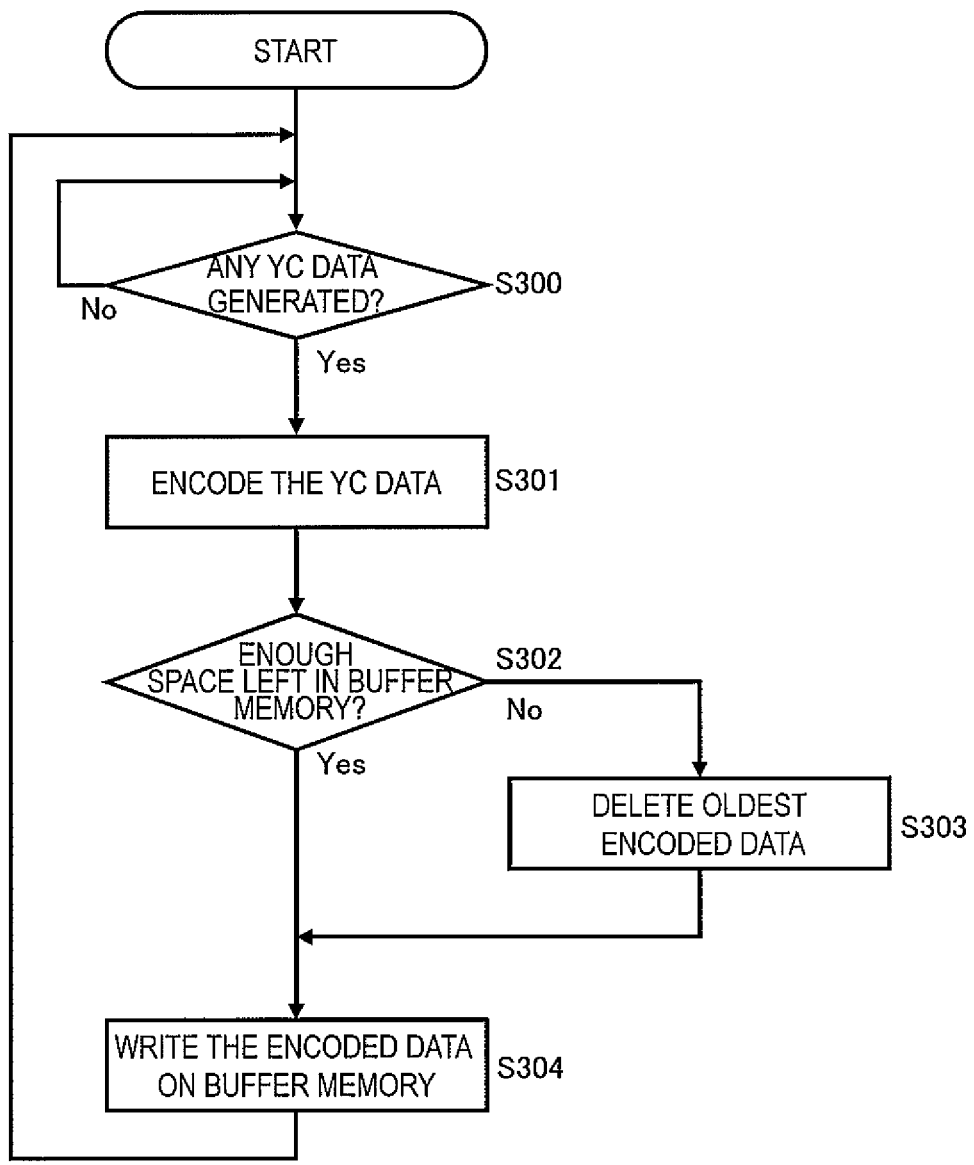
FIG. 8 is a flowchart showing the procedure of movie buffering processing.

First of all, it will be described with reference to FIG. 8 how this digital camera 100 performs movie buffering. FIG. 8 is a flowchart showing the procedure of that movie buffering. In generating a chapter, the movie generating section 262 in the image processor 203 performs movie buffering following the flow shown in FIG. 8.

If the mode of operation of this digital camera 100 is set to be the shooting mode, the CCD image sensor 201 gets the subject image that has been produced through the optical system 200 and sequentially generates image capturing data. As described above, the image capturing data that has been generated by the COD image sensor 201 is subjected to the processing at the AFE 202 and then input to the image processor 203, which subjects the given image capturing data to YC conversion processing, thereby generating YC data. In general, the image capturing data generated by the CCD image sensor 201 is RGB data. That is why YC conversion processing is carried out so that the RGB data is converted into data representing a luminance component Y and data representing a color difference component C.

The controller 210 sees if the image processor 203 has generated YC data yet (in Step S300). If no YC data has been generated yet (i.e., if the answer to the query of the processing step S300 is NO), the controller 210 waits until YC data is generated. On the other hand, if YC data has already been generated, then the controller 210 instructs the image processor 203 to encode the YC data generated by a predetermined encoding method. In accordance with the instruction given by the controller 210, the image processor 203 encodes the YC data generated by the predetermined encoding method, thereby generating encoded data (in Step S301). In this manner, the encoded data of a movie (chapter) is generated.

Next, using the buffer memory 205 as a ring buffer, the controller 210 writes the encoded data on the buffer memory 205. That is to say, the controller 210 determines whether or not there is at least a predetermined space left in the buffer memory 205 (in Step S302). If the space left in the buffer memory 205 is less than the predetermined value (i.e., if the answer to the query of the processing step S302 is NO), then the controller 210 deletes the oldest encoded data that has been stored in the buffer memory 205 (in Step S303). In this processing step, if the encoded data has been generated in the MPEG file format, then the encoded data is deleted on a GOP (group of pictures) basis. Next, the controller 210 writes the encoded data that has been generated in Step S301 on the buffer memory 205 in which there is plenty of space left now as a result of the processing step S303. On the other hand, if the space left in the buffer memory 205 is equal to or greater than the predetermined value (i.e., if the answer to the query of the processing step S302 is YES), then the controller 210 writes the encoded data that has been generated in Step S301 as it is on the buffer memory 205 (in Step S304). After that, the controller 210 performs the same series of processing steps S300 through S304 all over again.

Figure 9:
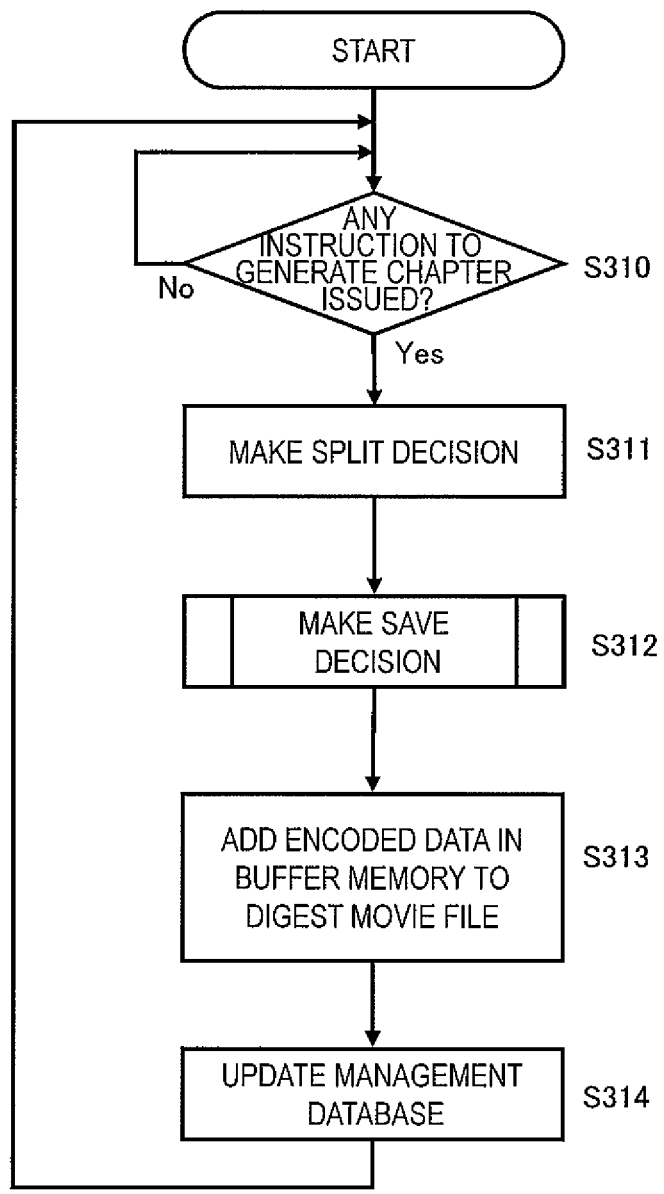
FIG. 9 is a flowchart showing the procedure in which a chapter of a digest movie is generated.

Next, it will be described with reference to FIG. 9 how to generate a movie (chapter) in accordance with an instruction to shoot a still picture. FIG. 9 is a flowchart showing the procedure in which one chapter of a digest movie is generated.

First, the controller 210 sees if any instruction to generate a movie (chapter) in accordance with an instruction to shoot a still picture has been issued (in Step S310). If any instruction to generate a chapter in response to an instruction to shoot a still picture as a trigger has been issued, the controller 210 decides whether the chapter to generate newly should be added to an existent digest movie file or a new digest movie file should be generated and the chapter should be saved there (in Step S311). Such a processing step will be referred to herein as a "split decision". The split decision is made by determining whether or not a digest movie related to a chapter to record has been recorded on the memory card 221 yet. For example, if a digest movie file including a chapter that was generated on the same day as a chapter to generate newly has already been written on the memory card 221, then the controller 210 adds the chapter to generate newly to the existent digest movie file. On the other hand, if such a digest movie file including a chapter that was generated on the same day as a chapter to generate newly has not been written on the memory card 221 yet, then the controller 210 saves the chapter on a new digest movie file separately from the existent digest movie file. In this processing step S311, an existent digest movie file related may be found by reference to not only the date and time but also other kinds of information. For example, if there is an existent digest movie file, of which the shooting location, the subject shot or the shooting mode is either the same or similar, then the chapter newly generated may be added to that file. Optionally, when a chapter is generated, the controller 210 may prompt the user to decide whether or not he or she'd like to add that chapter to any particular existent digest movie file.

Next, the controller 210 performs save decision processing (in Step S312), which includes the processing step of determining whether or not the encoded data stored in the buffer memory 205 should be saved as a chapter and the processing step of determining what movie interval should be saved as a chapter. This save decision processing S312 will be described in detail later. If the decision has been made in Step S312 that the encoded data should not be saved as a chapter, the controller 210 ends the process.

Next, if the decision has been made in Step S312 that the encoded data should be saved as a chapter, then the controller 210 retrieves the encoded data that is stored in the buffer memory 205 for the movie interval that has been determined in Step S312 and adds it to the digest movie file that has already been written on the memory card 221 or saves it on a newly generated digest movie file (in Step S313).

Next, the controller 210 adds information about the newly generated chapter to the management database and updates the management database (in Step S314). The management information to be added to the management database includes content ID, content type, digest movie ID, real file name, chapter information, relation information, shooting information and so on as shown in FIG. 7.

[1-2-4. Digest Movie Recording Operation (Details of Save Decision Processing)]

Next, the save decision processing S312 will be described in detail with reference to FIGS. 10 and 11.

Figure 10:
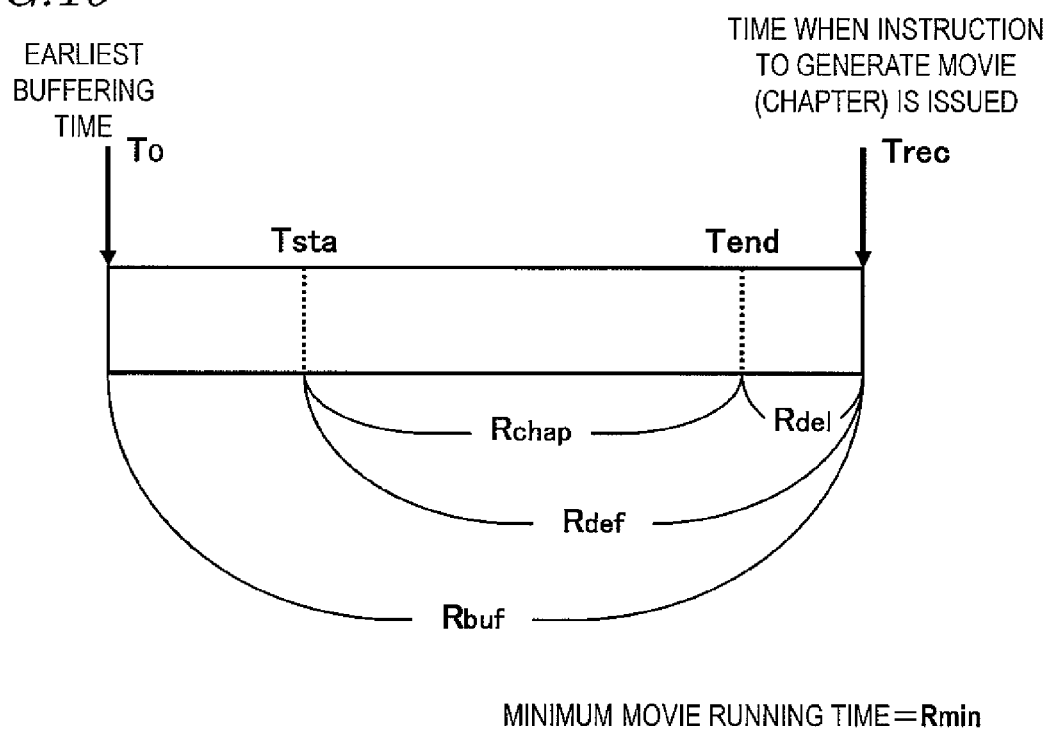
FIG. 10 illustrates how save decision processing may be carried out on one chapter.

FIG. 10 illustrates how to carry out save decision processing on one chapter. Specifically, FIG. 10 shows how encoded data is buffered in the buffer memory 205 (such data will be sometimes referred to herein as "buffered encoded data") with time. As for the buffered encoded data, the earliest buffering time is identified herein by T0, the point in time when an instruction to generate a movie (chapter) is issued by Trec, the total running time of the buffered encoded data by Rbuf, and the start time, end time and running time of the encoded data to be extracted based on a result of the save decision by Tsta, Tend and Rchap, respectively. Also, the chapter length that has been set on the menu shown in FIG. 5 is identified herein by Rdef and the running time of a portion to be deleted from the end of the buffered encoded data that has been subjected to the save decision processing by Rdel. It is by reference to the management information of the chapter what portion should be deleted from the end of the buffered encoded data. Also, the minimum movie running time of a chapter is identified herein by Rmin. In this case, the minimum movie running time is the shortest running time of a chapter. That is to say, if the running time of a chapter is short of the minimum movie running time, that chapter is not saved.

Figure 11:
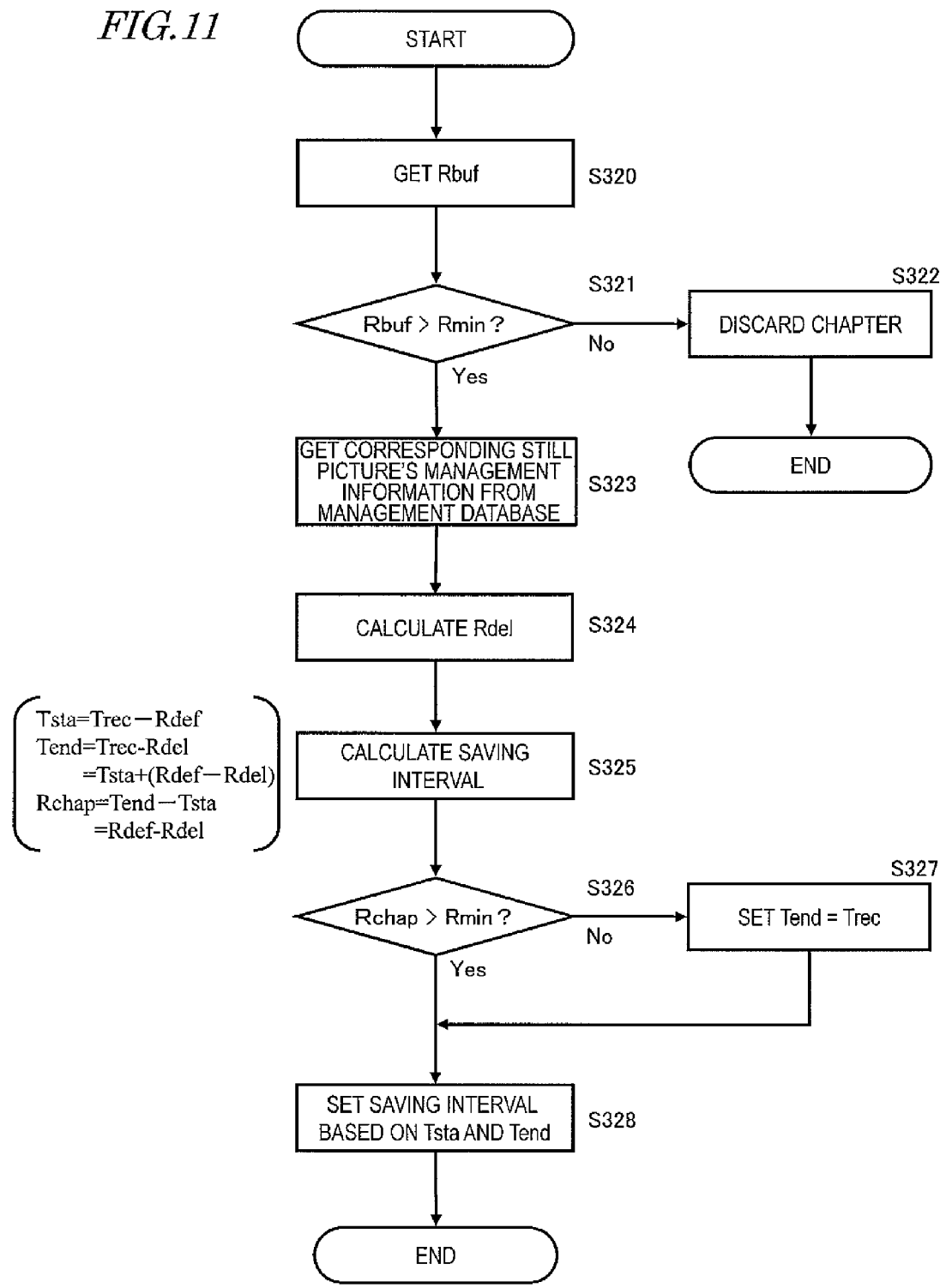
FIG. 11 is a flowchart showing the detailed procedure of carrying out the save decision processing on one chapter.

FIG. 11 is a flowchart showing the detailed procedure of carrying out the save decision processing on one chapter.

First of all, the controller 210 gets information about the total running time Rbuf of the encoded data that is stored in the buffer memory 205 (in Step S320). Next, the controller 210 determines whether or not the running time of the encoded data buffered in the buffer memory 205 is longer than the minimum movie running time (in Step S321). That is to say, the controller 210 compares the time lengths of Rbuf and Rmin to determine whether or not Rbuf>Rmin is satisfied. If the answer to the query of the processing step S321 is NO, then the length of the chapter is short of the minimum movie running time, and the controller 210 ends this process without saving that chapter (in Step S322).

On the other hand, if the answer to the query of the processing step S321 is YES, the controller 210 gets the management information of a still picture, corresponding to the chapter to be subjected to the save decision processing, from the management database (in Step S323). Next, by reference to the management information thus gotten, the controller 210 calculates the running time Rdel of the movie portion to be deleted (in Step S324).

Now, it will be described how to calculate Rdel. The management information managed in the management database includes items for which Rdel is set and items for which Rdel is not set. For example, as for the flash information managed in the management database, Rdel is set. If a still picture is shot with the flash fired, then the movie shot just before the still picture is shot will include a scene irradiated with flashlight. That is why Rdel is set to avoid such a situation. If a chapter were generated without paying attention to the fact that a still picture has been shot with the flash fired, then the chapter generated would include a scene irradiated with the flashlight (i.e., a whitened scene) and should be uncomfortable to view. Thus, to avoid such an unwanted situation, the digital camera 100 of this embodiment generates a chapter so as to remove such a flashlight-irradiated scene (movie interval) based on the Rdel value that has been set with respect to the flash if a still picture has been shot with the flash fired. As a result, the chapter generated can be more comfortable to view.

In this embodiment, the flashlight-irradiated scene is supposed to be removed from a movie which is related to a still picture that has been shot with the flash fired. However, this is only an example of the present disclosure. Alternatively, Rdel may also be set so as to remove a scene in which the viewer can hear the sound of strobe light unit's popping up just before a still picture is shot with the flash fired. Still alternatively, Rdel may also be set so as to remove a scene irradiated with the AF assist light beam.

Figures 12, 13:
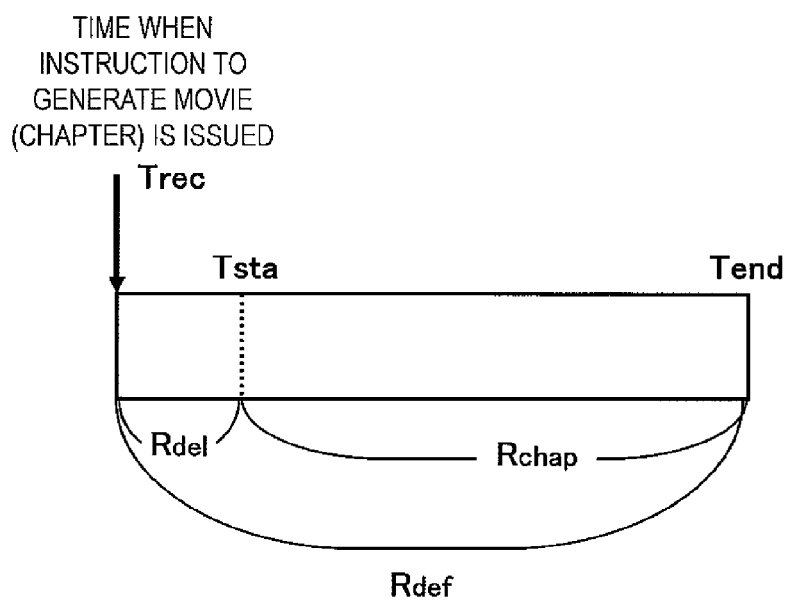
FIG. 12 is an exemplary table for use to determine which portions of a chapter should be deleted how long.
FIG. 13 illustrates another example of save decision processing on one chapter.

As to what portion of the chapter should be deleted how much if any of these particular shooting situations arises, management can be made using a database (or table) which is provided separately from the management database, for example. FIG. 12 shows exemplary pieces of information to be stored on such a table. In this example, when the flash is ON, movie intervals are deleted for 0.5 seconds just before and right after an instruction to generate a chapter is accepted. Also, when the AF assist lamp is ON, a movie interval is deleted for 0.3 seconds just before an instruction to generate a chapter is accepted. The table shown in FIG. 12 may include information about other shooting situations, too. If such a table is stored on a storage medium (such as the flash memory 222) of the digital camera 100, then the controller 210 can determine, by reference to that table as well as the management database, what portions should be deleted how long (Rdel). Optionally, the management database itself may include information indicating what portions should be deleted how long with respect to a particular item of the shooting information.

Next, the controller 210 calculates a saving interval (i.e., the interval from Tsta through Tend) to be extracted as a chapter from the encoded data that is buffered in the buffer memory 205 (in Step S325). In this processing step, the controller 210 calculates the saving interval by the following equations:

$$T\text{sta}=T\text{rec}-R\text{def} \quad (1)$$

$$T\text{end}=T\text{rec}-R\text{del}=T\text{sta}+(R\text{def}-R\text{del}) \quad (2)$$

$$R\text{chap}=T\text{end}-T\text{sta}=R\text{def}-R\text{del} \quad (3)$$

Subsequently, the controller 210 determines whether or not the chapter running time Rchap, obtained by deleting the end portion of the encoded data based on the value of Rdel, is longer than the minimum movie running time Rmin (in Step S326). If Rchap has turned out to be longer than Rmin (i.e., if the answer to the query of the processing step S326 is YES), then the controller 210 sets the saving interval based on Tsta and Tend that have been calculated by Equations (1) and (2) (in Step S328). On the other hand, if Rchap has turned out to be equal to or shorter than Rmin (i.e., if the answer to the query of the processing step S326 is NO), then the controller 210 replaces Tend with Trec (in Step S327). And the controller 210 sets the saving interval based on Tsta that has been calculated by Equation (1) and on Tend that has been replaced with Trec (in Step S328). This is done to prevent a scene that is even shorter than the minimum movie running time and that ends instantly from being generated by deleting the end portion of the encoded data based on the value of Rdel.

In the example described above, a chapter portion is supposed to be deleted just before an instruction to generate a chapter is accepted. However, this is just an example of the present disclosure. The controller 210 may perform similar processing to the one just described on a chapter portion right after an instruction to generate a chapter has been issued, too. Hereinafter, an example of such processing for deleting a portion of a movie right after an instruction to generate a chapter has been issued will be described.

FIG. 13 illustrates how to carry out chapter save decision processing right after an instruction to generate a chapter has been issued. The point in time when an instruction to generate a chapter is issued is identified herein by Trec, and the start time, end time and running time of the encoded data to be extracted based on a result of the save decision processing are identified herein by Tsta, Tend and Rchap, respectively. Also, the chapter length that has been set on the menu shown in FIG. 5 is identified herein by Rdef and the running time of a portion to be deleted by Rdel. It is by reference to the management information of the chapter what portion should be deleted. The minimum movie running time of a chapter is also identified herein by Rmin.

FIG. 14 is a flowchart showing the detailed procedure of carrying out save decision processing on one chapter in this example. First of all, the controller 210 gets the management information of a still picture, corresponding to a chapter to be subjected to the save decision processing, from the management database (in Step S423). Next, by reference to the management information thus gotten, the controller 210 calculates the running time Rdel of a movie portion to be deleted (in Step S424). Rdel can be calculated in the same way as in the example described above.

Next, the controller 210 calculates a saving interval (i.e., the interval from Tsta through Tend) to be extracted as a chapter from the encoded data that is buffered in the buffer memory 205 (in Step S425). In this processing step, the controller 210 calculates the saving interval by the following equations:

$$T\text{sta}=T\text{rec}+R\text{del} \quad (4)$$

$$T\text{end}=T\text{rec}+R\text{def}=T\text{sta}+(R\text{def}-R\text{del}) \quad (5)$$

$$R\text{chap}=T\text{end}-T\text{sta}=R\text{def}-R\text{del} \quad (6)$$

Subsequently, the controller 210 determines whether or not the chapter running time Rchap, obtained by deleting the top portion of the encoded data with the length Rdel, is longer than the minimum movie running time Rmin (in Step S426). If Rchap has turned out to be longer than Rmin (i.e., if the answer to the query of the processing step S426 is YES), then the controller 210 sets the saving interval based on Tsta and Tend that have been calculated by. Equations (4) and (5) (in Step S428). On the other hand, if Rchap has turned out to be equal to or shorter than Rmin (i.e., if the answer to the query of the processing step S426 is NO), then the controller 210 replaces Tend with Trec (in Step S427). And the controller 210 sets the saving interval based on Tsta that has been calculated by Equation (1) and on Tend that has been replaced with Trec (in Step S428).

By performing these processing steps, an easy-to-view digest movie, from which an unnecessary chapter portion has been deleted, can be generated.

In the example described above, in order to set the saving interval based on Tsta and Tend, the Rdel value is supposed to be obtained by reference to the management information of a still picture which is related to a chapter to be subjected to the save decision processing. However, this is just an example. Alternatively, management information about the encoded data buffered may be saved from time to time in an internal memory, and a scene from which an unnecessary scene has been removed (i.e., the saving interval) may be set in Step S324 by reference to that management information saved in the internal memory. More specifically, information indicating whether or not the movie has been shot vertically or horizontally (which will be referred to herein as "vertical/horizontal information") may be saved as management information every time shooting is made, and only scenes that have been shot with the camera held in the horizontal position may be extracted as chapters. By reference to the management information that has been saved from time to time in the internal memory with respect to the encoded data buffered, portions to be extracted as chapters can be determined more flexibly.

[1-3. Effects]

As described above, a digital camera (image capture device) 100 according to this embodiment includes: an image capturing section 264 which is configured to generate and output image capturing data in response to a shooting instruction; an image processor 203 which is configured to generate movie data (chapter) based on the image capturing data supplied from the image capturing section 264; and a controller 210 which is configured to generate a digest movie file including edited movie data, which is obtained by deleting a portion of a movie represented by the movie data, if the contents of management information associated with the movie data and/or the movie data itself satisfy a predetermined condition. As a result, an easy-to-view digest movie, from which unnecessary portions have been deleted, can be generated.

In one embodiment, the shooting instruction is an instruction to shoot a still picture, and the image processor 203 is configured to generate the movie data and still picture data in response to the instruction to shoot a still picture. According to such an embodiment, a movie can be recorded synchronously with shooting a still picture, and therefore, a digest movie file can be generated so as to respect the user's preference.

In another embodiment, the controller 210 can generate a digest movie file by combining together edited chapter data and the still picture data. According to such an embodiment, the viewer can easily see which still picture corresponds to each scene of the digest movie.

In still another embodiment, the management information may include information indicating whether or not a flash 113 has been used to shoot the still picture. And the controller 210 may be configured to generate the edited movie data by deleting a portion of the movie represented by the chapter that has been generated by the image processor 203 if the information indicating whether or not the flash 113 has been used tells that that portion is affected by flashlight emitted from the flash 113. According to such an embodiment, scenes whitened by firing the flash 113 can be removed, and therefore, an easy-to-view digest movie can be generated.

In yet another embodiment, the management information may include information indicating whether or not an AF assist lamp 114 has been used for autofocusing in shooting the still picture. And the controller 210 may be configured to generate the edited movie data by deleting a portion of the movie represented by the chapter that has been generated by the image processor 203 if the information indicating whether or not the AF assist lamp 114 has been used tells that that portion is affected by light emitted from the AF assist lamp 114. According to such an embodiment, scenes to be affected by the light emitted from the AF assist lamp 114 can be removed, and therefore, an easy-to-view digest movie can be generated.

In yet another embodiment, if a digest movie file related to the chapter that has been generated by the image processor 203 has already been written on the storage medium (such as a memory card 221), the controller 210 adds the edited chapter to the existent digest movie file. According to such an embodiment, each and every related chapter is saved in a single digest movie file, and therefore, the viewer can enjoy a digest movie in which only related scenes are collected together.

In yet another embodiment, the image processor 203 is configured to generate the chapter in response to the shooting instruction and based on an image capturing signal which has been obtained in a preset period of time including a point in time when the shooting instruction was given. According to such an embodiment, the digest movie file generated includes chapters before and after the shooting instruction is accepted, and therefore, the shooter's preference can be respected.

Embodiment 2

Hereinafter, a second embodiment of the present disclosure will be described. The digital camera 100 of the first embodiment described above generates a chapter by removing unnecessary scenes during shooting. On the other hand, the digital camera 100 of this embodiment generates a chapter without removing unnecessary scenes during shooting. Instead, the digital camera 100 does remove unnecessary scenes during playback, editing or uploading in order to generate a chapter. The following description of this second embodiment will be focused on such differences from the first embodiment.

[2-1. Configuration]

The digital camera of this embodiment has the same electrical configuration as the digital camera 100 of the first embodiment that has already been described with reference to FIGS. 1 through 3, and its description will be omitted herein. Also, since their configurations are the same, any component of the digital camera of this embodiment, having substantially the same function as its counterpart of the first embodiment, is identified by the same reference numeral in the following description.

[2-2. Operation]

[2-2-1. Digest Movie Recording Operation]

The digest movie recording operation of this embodiment is performed in the same way as in the first embodiment described above except that a chapter is generated in this embodiment without removing unnecessary scenes during shooting. Thus, description of their common operation will be omitted herein to avoid redundancies.

[2-2-2. Digest Movie Playback Operation]

Hereinafter, it will be described how to play back a digest movie. The digest movie playback operation of this embodiment includes a movie-only playback operation for playing back only a digest movie (chapter) by itself and a movie/still picture combined playback operation for playing back a digest movie in combination with its related still picture. In the example to be described below, a digest movie and its related still picture are supposed to have been written on the memory card 221 by performing the operation that has already been described with reference to FIG. 9.

Figure 15A:
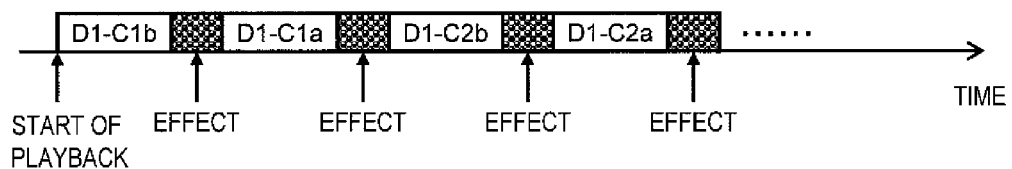
FIG. 15A illustrates generally how to perform a movie-only playback operation on a digest movie.

FIG. 15A illustrates generally how to perform the movie-only playback operation. In performing such a movie-only playback operation, a chosen one of digest movies that have been written and stored on the memory card 221 is played back by itself in accordance with a user's playback instruction. In that case, the controller 210 inserts a special effect (such as fade-in or fade-in) between each pair of chapters that form that digest movie that has been chosen by the user as the one to play back, thereby playing back the series of chapters continuously as shown in FIG. 15A. In this manner, those chapters can be played back so as to impress the viewer.

Figure 15B:
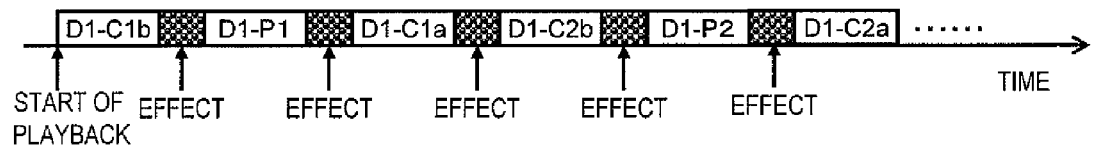
FIG. 15B illustrates generally how to perform a movie/still picture combined playback operation on a digest movie.

FIG. 15B illustrates generally how to perform the movie/still picture combined playback operation. In performing such a movie/still picture combined playback operation, a chosen one of digest movies that have been written and stored on the memory card 221 is played back in combination with its related still pictures in accordance with a user's playback instruction. In that case, the controller 210 inserts a related still picture, along with a special effect (such as fade-in or fade-in), between each pair of chapters that form that digest movie that has been chosen by the user as the one to play back, thereby playing back the series of chapters continuously as shown in FIG. 15B. By inserting those still pictures while a series of chapters are being played back continuously, the viewer can see easily what still picture was shot when each chapter was recorded. As a result, a digest movie can be presented more impressively by combining those still pictures with the movie.

According to this embodiment, the special effect is not limited to any particular one and does not have to be fade-in or fade-out described above. Alternatively, the special effect may also be rotation or slide-in (from the top, bottom, left end or right end of the screen). Supposing the running time of each chapter is five seconds, the duration of the special effect may be set to be approximately two seconds, for example. However, the special effect does not have to have such a length but may be set to have any arbitrary duration. Furthermore, the special effect does not always have to be inserted but one content may be changed into another as soon as the former content ends.

Next, it will be described with reference to FIG. 16 exactly how to play back a digest movie.

FIG. 16 is a flowchart showing an exemplary procedure of playing back a digest movie. The controller 210 searches the management database to find what content is related to the digest movie that has been chosen as the movie to play back. More specifically, the controller 210 searches content (including chapters and still pictures), of which the digest movie ID is that of the digest movie to play back, to find the content to be played back first and get its content ID (in Step S330). Such content to be played back first may be a chapter, of which the shooting time stamp is the earliest, for example.

Next, the controller 210 searches the management database to retrieve management information which is associated with the content ID that has been gotten in the previous processing step S330 from the management database (in Step S331).

Subsequently, the controller 210 determines, by reference to the content type information included in the management information retrieved, whether the content to play back next is a still picture or a movie (chapter) (in Step S332). If the content to play back next is a still picture, the controller 210 gets its real file name from the management information, reads a still picture with that file name, and displays it on the LCD monitor 204 (in Step S333). On the other hand, if the content to play back next is a movie chapter, then the controller 210 gets its real file name and chapter information from the management information, reads a chapter with that file name, and displays it on the LCD monitor 204 (in Step S334). It will be described in detail later exactly how to read the chapter in this processing step S334.

Next, after having played back the content in either Step S333 or S334, the controller 210 inserts a special effect (in Step S335).

Thereafter, the controller 210 determines whether or not a series of playback operations of the content that forms the digest movie that has been chosen as the one to play back has gotten done (in Step S336). If the answer is YES, the controller 210 ends the playback operation.

On the other hand, if the series of playback operations of the content that forms the digest movie that has been chosen as the one to play back has not gotten done yet (i.e., if the answer to the query of the processing step S336 is NO), then the controller 210 searches the management database to get the ID of the content to play back next (in Step S337). And the process goes back to the processing step S331, in which the controller 210 searches the management database to retrieve the management information of the content to play back next. After that, until the decision is made in Step S336 that a series of playback operations of the content that forms the chosen digest movie has gotten done, the controller 210 performs the same series of processing steps S331 through S337 over and over again. In this manner, a series of content can be played back.

The order in which the content is played back may be determined in the following manner, for example. The content may be played back time-sequentially so that a chapter that had been shot before a still picture was shot is played back first, the still picture next, and then a chapter that was shot after the still picture had been shot. By playing back the content time-sequentially, the user can call up his or her memories along the time axis. However, this is only an example and the content may be played back in any other order as well.

In the flowchart shown in FIG. 16, still pictures and chapters are supposed to be played back in combination. However, if chapters are played back by themselves, then only the content ID of a chapter may be gotten in Step S330.

Figure 17:
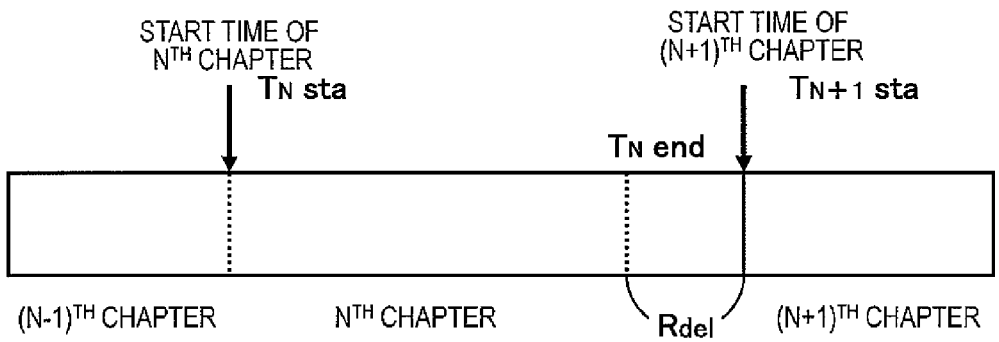
FIG. 17 illustrates a chapter playback interval.
Figure 18:
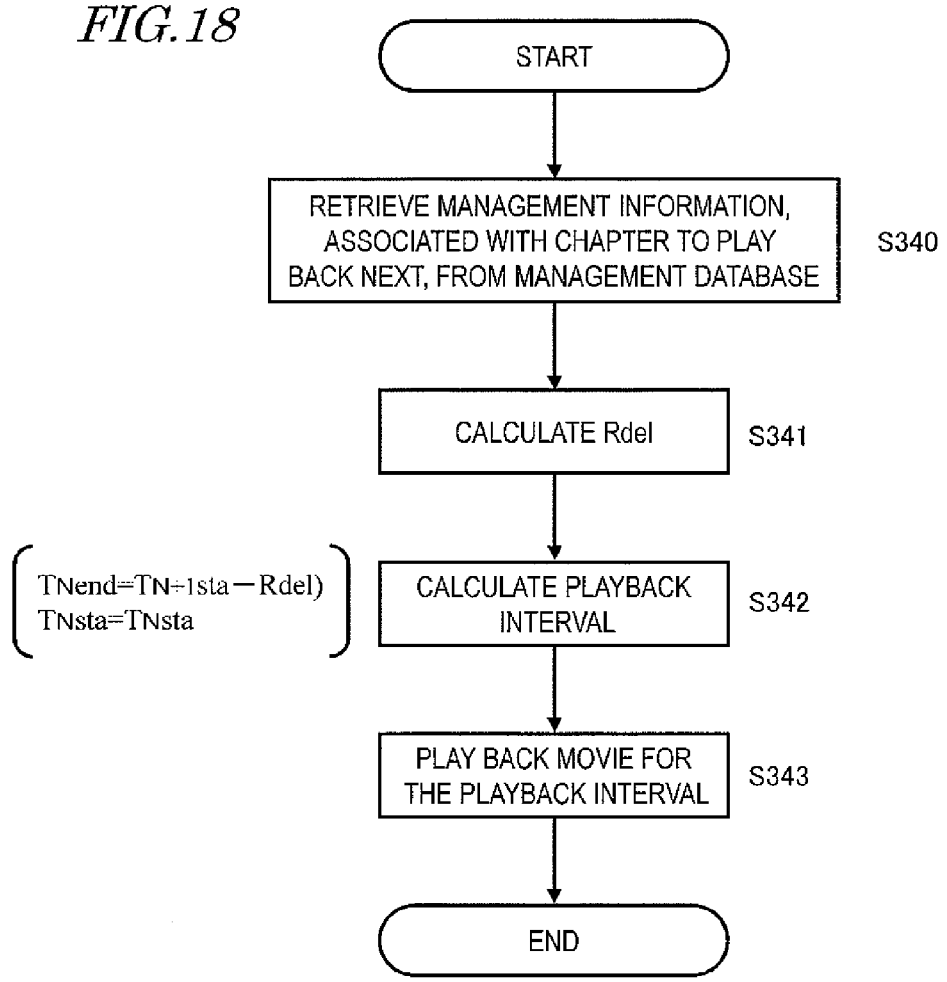
FIG. 18 is a flowchart showing a detailed procedure of chapter playback interval setting processing.

Hereinafter, it will be described with reference to FIGS. 17 and 18 exactly how to perform the chapter playback processing step S334. In FIGS. 17 and 18, an $N^{th}$ chapter is supposed to be what needs to be played back next for the sake of convenience.

FIG. 17 illustrates a chapter playback interval. In FIG. 17, shown are the timings when chapters included in a digest movie are played back. In this example, the start time of the $N^{th}$ chapter is identified herein by TNsta. The end time of the $N^{th}$ chapter agrees with the start time of the $(N+1)^{th}$ chapter, and is identified herein by TN+1sta. The end time of the $N^{th}$ chapter that needs to be presented on the LCD monitor 204 is identified herein by TNend, and the running time of a chapter portion not to be presented on the LCD monitor 204 as measured from its tail is identified herein by Rdel.

FIG. 18 is a flowchart showing a detailed procedure of chapter playback interval setting processing.

First, the controller 210 searches the management database to retrieve management information about the chapter to play back next (in Step S340). Next, the controller 210 calculates Rdel based on the management information thus gotten (in Step S341).

Rdel may be calculated in the same way as in the first embodiment described above. Rdel may be set with respect to some items of the management information that is managed in the management database but may not be set with respect to other items of the management information. For example, Rdel may be set with respect to the flash information that is managed in the management database. The reason is as follows. If a still picture is shot with the flash fired, then the movie chapter shot just before the still picture is shot will include a scene irradiated with flashlight. That is why Rdel is set to avoid playing back such a scene. If a chapter were played back without paying attention to the fact that a still picture has been shot with the flash fired, then the movie (chapter) played back would include a scene irradiated with the flashlight (i.e., a whitened scene) and should be uncomfortable to view. Thus, to avoid such an unwanted situation, the digital camera 100 of this embodiment changes the end time of a chapter so as to remove such a flashlight-irradiated scene based on the Rdel value that has been set with respect to the flash. As a result, the chapter played back can be more comfortable to view.

In this embodiment, the playback operation is supposed to be carried out with such a flashlight-irradiated scene removed. However, this is only an example of the present disclosure. Alternatively, Rdel may also be set so as to remove a scene in which the viewer can hear the sound of strobe light unit's popping up just before a still picture is shot with the flash fired. Still alternatively, Rdel may also be set so as to remove a scene irradiated with the AF assist light beam.

Next, the controller 210 calculates what interval the $N^{th}$ chapter needs to be played back for (i.e., calculates its playback interval) in Step S342. Specifically, the controller 210 calculates the playback interval (TNsta, TNend) by the following equations:

$$TNsta = TNsta \quad (7)$$

$$TNend = TN+1sta - Rdel \quad (8)$$

Thereafter, the controller 210 plays back the chapter for the playback interval (TNsta, TNend) that has been calculated in the previous processing step S342 and gets the chapter presented on the LCD monitor 204 (in Step S343).

As can be seen, according to this embodiment, a digest movie (chapters) can be played back with unnecessary scenes removed. As a result, the digest movie played back should be comfortable to view.

Optionally, the same decision processing step as Step S326 shown in FIG. 11 may be performed, too. In that case, the partial deletion processing will be carried out only if the running time of the playback interval Rchap=TNend−TNsta is shorter than the minimum movie running time Rmin, and therefore, it is possible to avoid generating too short chapters. Also, according to this embodiment, a movie portion right after an instruction to generate a chapter has been accepted may also be deleted as already described with reference to FIGS. 13 and 14.

[2-2-3. Digest Movie Editing Operation]

Next, it will be described with reference to FIG. 19 how to edit a digest movie.

According to this embodiment, a digest movie can be edited into a best one by extracting only best shot scenes from the given chapters by reference to the management information that is stored in the management database. Those best shot scenes can be extracted from the given chapters by the same technique as the one for playing back only good scenes with unnecessary scenes removed from the given chapters in the playback operation shown in FIG. 18.

Figure 19:
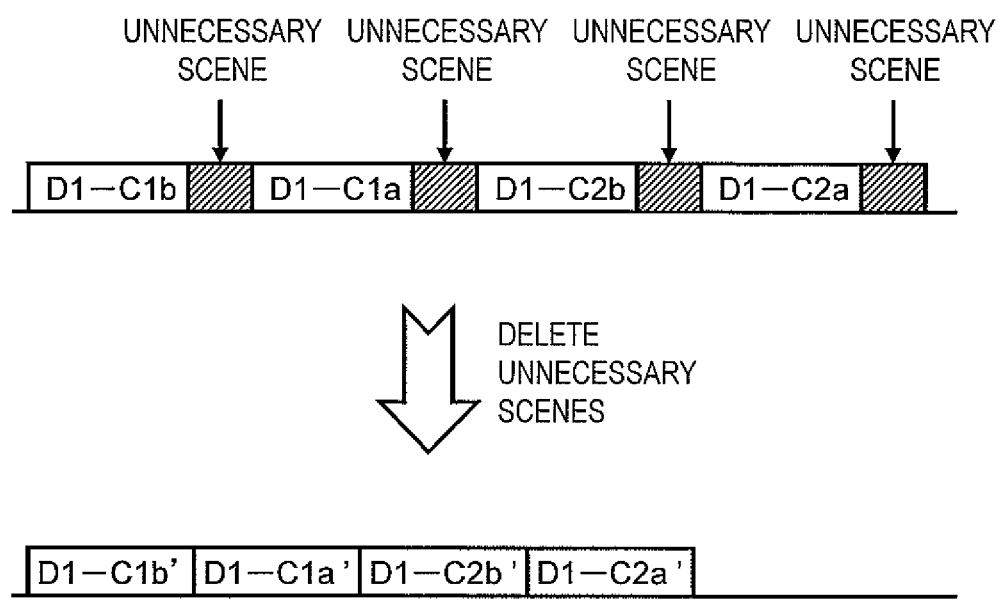
FIG. 19 illustrates how to perform editing processing on a digest movie at a time.

In this embodiment, the respective chapters may be edited so as to make a best digest movie by extracting only best shot scenes at a time from the digest movie as shown in FIG. 19. Also, the best digest movie thus made may be output as a new digest movie file.

It should be noted that the device that edits a digest movie does not have to be the digital camera 100 but may also be any other kind of external device (image processing apparatus) such as a personal computer, a cellphone, or a server computer. If a digest movie needs to be edited using any of those external devices, the data stored in the memory card 221 which has already been described with reference to FIG. 6 may be copied and used.

[2-2-4. Digest Movie Uploading Operation]

Next, it will be described how to upload a digest movie.

The controller 210 of this embodiment can upload a digest movie. Specifically, the controller 210 uploads a digest movie to another communications device via the communications interface 250. In this case, the controller 210 uploads a best digest movie by extracting only best shot scenes by reference to the management information stored in the management database. Those best shot scenes can be extracted from the given chapters by the same technique as the one for playing back only good scenes with unnecessary scenes removed from the given chapters in the playback operation shown in FIG. 18. Optionally, before uploading such a digest movie by extracting only best shot scenes, the controller 210 may display a preview on the LCD monitor 204. And after the user has performed an operation indicating that he or she OKs its transmission, such a digest movie consisting of only those best shot scenes extracted may be uploaded.

It should be noted that the device on the receiving end, to which such a digest movie is going to be uploaded, may be another digital camera, a communications device such as a smart phone, or a server on a crowd service network. In other words, the device on the receiving end may be any device as long as it has communications capability.

[2-3. Effects]

As described above, an image processing apparatus (such as the digital camera 100) according to this embodiment includes: an interface (such as the communications interface 250) which is configured to get a digest movie file including multiple items of movie data (chapters) that have been generated by shooting; and a controller 210 which is configured to generate edited movie data by deleting a portion of a movie represented by the movie data if the contents of management information associated with the movie data and/or the movie data itself satisfy a predetermined condition for each of the items of the movie data included in the digest movie file. According to such an embodiment, a best digest movie can be generated by removing unnecessary portions which are uncomfortable to view from a digest movie file that has already been generated.

In addition, such a digest movie, from which unnecessary portions have been removed, may be written as a different file on a storage medium. Or such a digest movie, from which unnecessary portions have been removed, may also be presented on a display or uploaded to another communications device. As a result, the user can enjoy a best digest movie that has been edited with a different device other than the digital camera 100 that has shot it.

Other Embodiments

Although Embodiments 1 and 2 have been described herein as just examples of the technique of the present disclosure, various modifications, replacements, additions or omissions can be readily made on those embodiments as needed and the present disclosure is intended to cover all of those variations. Also, a new embodiment can also be created by combining respective elements that have been described for those Embodiments 1 and 2 disclosed herein.

Thus, other embodiments of the present disclosure will be described as an example.

In the embodiments described above, in response to a user's instruction (e.g., an instruction to shoot a still picture that has been given by pressing a release button 110 or an instruction to make a digest movie), the digital camera 100 selects parts of the movie data that has been written on the buffer memory 205 for a predetermined period around the time of instruction and writes those selected parts as a digest movie file. However, this is only an example of the technique of the present disclosure. For example, the controller 210 may monitor the present time managed by the digital camera 100 and start to write a chapter when it comes to a predetermined time. Alternatively, the controller 210 may monitor geographic coordinates information output from the GPS unit 270 and start to write a chapter when the digital camera 100 enters into a predetermined geographic coordinates area. Additionally, a chapter may be generated in accordance with not only an explicit instruction from a user but also an instruction provided automatically by a program stored on a storage medium in the camera.

In the embodiments described above, to generate a digest movie, the encoded data is supposed to be buffered in the buffer memory 205 as shown in FIG. 8. However, this is only an example of the technique of the present disclosure. For example, if a lot of space in the buffer memory 205 needs to be used at a time as in performing continuous shooting sessions, then the buffer memory 205 may be emptied once by discarding the encoded data that has been stored in the buffer memory 205. As a result, it is possible to prevent the digest movie recording operation from interfering with other kinds of shooting operations such as continuous shooting sessions, thus providing a more convenient tool for the user.

Also, in the embodiments described above, a scene to be removed from chapters that form a digest movie is mainly supposed to be a scene irradiated with flashlight or a scene irradiated with an AF assist light beam. However, these are just examples of such scenes to remove. For instance, a scene, in which the diaphragm has been operated to a predetermined degree or more to shoot a still picture, a scene in which the zoom lens has moved at or more than a predetermined velocity to shoot a still picture, and a scene in which the image quality is decreased and the frame rate is increased to perform a high-speed AF operation may also be removed. As a result, scenes which are not easy to view as a movie can be removed to allow the user to enjoy the digest movie more comfortably.

Furthermore, the controller 210 may remove any arbitrary inappropriate scene to save as a chapter from the movie that is going to be saved, not only just before or right after an instruction to generate a chapter is issued. Examples of such inappropriate scenes to save as a chapter include a scene with a significant degree of camera shake or tilt, a scene with too high or too low a luminance level, an out-of-focus scene, and a scene with too high or too low an audio level. As to whether it is an inappropriate scene or not and how much that inappropriate scene should be deleted, the decision may be made not just by reference to the management information but also based on a result of analysis on the contents of the movie. In other words, the controller 210 may be configured to generate a movie file including edited movie data, which is obtained by deleting a portion of a movie represented by the chapter, if the contents management information associated with the chapter and/or the chapter data itself satisfy a predetermined condition.

In the embodiments described above, for example, when the flash is ON, movie intervals are deleted for 0.5 seconds just before and right after an instruction to generate a chapter is accepted. However, this is only an example of the technique of the present disclosure. When the flash is ON, movie intervals of 0.5 seconds just before and right after an instruction to generate a chapter, which are intervals of flash, may not be selected as chapters. In such an example, the controller 210 may elongate a movie interval selected as a chapter forward or backward as compensation for not selecting movie intervals of 0.5 seconds just before and right after the instruction to generate a chapter. Specifically, when a predetermined time length of a chapter to be generated is "5 seconds", the controller 210 may elongate a movie interval selected as a chapter forward or backward so that the time length of the chapter is kept "5 seconds" instead of setting the time length to "4.5 seconds" after removing a movie interval of flash of "0.5 seconds".

As described above, the technique of the present disclosure is applicable to not just an image capture device but also any other computer (image processing apparatus) with the functions of the controller 210 as well. Such an image processing apparatus may have the same configuration as the controller 210 shown in FIG. 3, for example, and may operate as shown in FIGS. 8, 9, 11, 14, 16 and 18. That image processing apparatus includes an interface which is configured to get movie data that has been generated by shooting from another device; and a controller which is configured to generate a movie file including edited movie data by deleting a portion of a movie represented by the movie data if the contents of management information associated with the movie data and/or the movie data itself satisfy a predetermined condition.

That image processing apparatus may get later either movie data (chapter) that has been generated with a digital camera and written on a storage medium or movie data to be transmitted over telecommunications lines and may generate a digest movie file by subjecting the movie data to the processing described above. The image processing apparatus may further be a personal computer or a server on a crowd service network.

The technique of the present disclosure is also applicable to software (program) that defines the processing described above. The operation defined by such a program is as shown in FIGS. 8, 9, 11, 14, 16 and 18, for example. Such a program may be distributed by being stored in a removable storage medium and may also be downloaded over telecommunications lines. By making a processor built in a computer execute such a program, the various operations of the embodiments described above can be carried out.

Various embodiments have been described as examples of the technique of the present disclosure by providing the accompanying drawings and a detailed description for that purpose.

That is why the elements illustrated on those drawings and/or mentioned in the foregoing description include not only essential elements that need to be used to overcome the problems described above but also other inessential elements that do not have to be used to overcome those problems but are just mentioned or illustrated to give an example of the technique of the present disclosure. Therefore, please do not make a superficial decision that those inessential additional elements are indispensable ones simply because they are illustrated or mentioned on the drawings or the description.

Also, the embodiments disclosed herein are just an example of the technique of the present disclosure, and therefore, can be subjected to various modifications, replacements, additions or omissions as long as those variations fall within the scope of the present disclosure as defined by the appended claims and can be called equivalents.

The technique of the present disclosure is implementable as not only the digital camera 100 but also any other kind of image capture device such as a movie camera, a cellphone with camera, a wearable camera or a surveillance camera or an information processing apparatus such as a personal computer or a server computer.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-057030 filed Mar. 14, 2012, and No. 2013-049377 filed Mar. 12, 2013, the entire contents of which are hereby incorporated by reference.

What is claimed is:

1. An image processing apparatus, comprising:
an image processor configured to generate first movie data based on image capturing data, the image capturing data being obtained in response to a shooting instruction to shoot a still picture; and
a controller configured to generate a movie file including second movie data, the second movie data being obtained by deleting a portion of a movie represented by the first movie data when at least one of (i) the contents of management information associated with the first movie data and (ii) the contents of the first movie data itself satisfy a predetermined condition, wherein
the image processor is configured to generate the first movie data and the still picture data in response to the shooting instruction,
the management information includes information indicating whether or not light for shooting the still picture has been used, and
the controller is configured to generate the second movie data by deleting a portion of the movie represented by the first movie data, the portion being affected by the light for shooting the still picture, when the information indicates that the light has been used.

2. The image processing apparatus of claim 1, wherein the light for shooting the still picture is light emitted from a flash.

3. The image processing apparatus of claim 1, wherein the light for shooting the still picture is light emitted from an autofocus assist lamp for autofocusing in shooting the still picture.

4. The image processing apparatus of claim 1, wherein the controller is configured to generate the movie file by combining together the second movie data and the still picture data.

5. The image processing apparatus of claim 1, wherein the controller is configured to write the generated movie file on a storage medium.

6. The image processing apparatus of claim 5, wherein when a movie file related to the generated second movie data has already been written on the storage medium, the controller adds the generated second movie data to the movie file related to the generated second movie data.

7. The image processing apparatus of claim 1, wherein the image processor is configured to generate the first movie data in response to the shooting instruction and based on an image capturing signal that has been obtained in a preset period of time including a point in time when the shooting instruction was issued.

8. The image processing apparatus of claim 1, wherein the controller is configured to analyze the generated first movie data and to locate, based on a result of the analysis, a portion to be deleted from the first movie data.

9. An image processing apparatus, comprising:
an interface configured to obtain, from another device, first movie data that has been generated based on image capturing data obtained in response to a shooting instruction to shoot a still picture; and
a controller configured to generate a movie file including second movie data by deleting a portion of a movie represented by the first movie data when at least one of (i) the contents of management information associated with the movie data and (ii) the first movie data itself satisfy a predetermined condition, wherein
the management information includes information indicating whether or not light for shooting the still picture has been used, and
the controller is configured to generate the second movie data by deleting a portion of the movie represented by the first movie data, the portion being affected by the light for shooting the still picture, when the information indicates that the light has been used.

10. An image processing method, comprising:
obtaining first movie data that has been generated based on image capturing data obtained in response to a shooting instruction to shoot a still picture; and
generating a movie file including second movie data by deleting a portion of a movie represented by the first movie data when at least one of (i) the contents of management information associated with the movie data and (ii) the first movie data itself satisfy a predetermined condition, wherein
the management information includes information indicating whether or not light for shooting the still picture has been used, and
the generating the movie file comprises generating the second movie data by deleting a portion of the movie represented by the first movie data, the portion being affected by the light for shooting the still picture, when the information indicates that the light has been used.

* * * * *